(12) United States Patent
Enderle et al.

(10) Patent No.: US 11,021,288 B2
(45) Date of Patent: Jun. 1, 2021

(54) PACKAGING MACHINE HAVING A PROCESS-CONTROLLED EARLY START FUNCTION

(71) Applicant: MULTIVAC SEPP HAGGENMÜLLER SE & CO. KG, Wolfertschwenden (DE)

(72) Inventors: Tobias Enderle, Bad Grönenbach (DE); Thomas Holderied, Dietmannsried (DE); Claus Botzenhardt, Kempten (DE)

(73) Assignee: MULTIVAC SEPP HAGGENMUELLER SE & CO. KG, Wolfertschwenden (DE)

( * ) Notice: Subject to any disclaimer, the term of this patent is extended or adjusted under 35 U.S.C. 154(b) by 442 days.

(21) Appl. No.: 15/750,488

(22) PCT Filed: Aug. 8, 2016

(86) PCT No.: PCT/EP2016/068902
§ 371 (c)(1),
(2) Date: Dec. 3, 2018

(87) PCT Pub. No.: WO2017/021558
PCT Pub. Date: Feb. 9, 2017

(65) Prior Publication Data
US 2019/0100340 A1    Apr. 4, 2019

(30) Foreign Application Priority Data

Aug. 6, 2015 (DE) ..................... 10 2015 214 992.7

(51) Int. Cl.
*B65B 57/00*    (2006.01)
*B29C 51/46*    (2006.01)
(Continued)

(52) U.S. Cl.
CPC .............. *B65B 57/00* (2013.01); *B29C 51/46* (2013.01); *B29C 65/18* (2013.01);
(Continued)

(58) Field of Classification Search
CPC ... B65B 57/00; B29C 51/46; B29C 66/00145; B29C 66/83221; B29C 66/849;
(Continued)

(56) References Cited

U.S. PATENT DOCUMENTS 4,209,957 A * 7/1980 Utzmann ................ B29C 51/18
                                                                264/101
4,691,496 A    9/1987 Anderson et al.
(Continued)

FOREIGN PATENT DOCUMENTS

CN    101241339 A    8/2008
CN    201566855 U    9/2010
(Continued)

OTHER PUBLICATIONS

European Communication Dated May 13, 2020, (with English Machine Translation—Notification of an Objection), Application No. 16754241.4-1016 (European Patent EP 3331767 B1), Applicant MULTIVAC Sepp Haggenmueller SE & Co. KG, 35 Pages.
(Continued)

*Primary Examiner* — Robert F Long
*Assistant Examiner* — Xavier A Madison
(74) *Attorney, Agent, or Firm* — Brooks Kushman P.C.

(57) ABSTRACT

A packaging machine, comprising a control unit, a plurality of measuring devices and a plurality of working units for different processes. The control unit is functionally connected to the working units and the measuring devices. A work cycle at the packaging machine comprises at least a first functional process and a second functional process at one or at different working units, the second functional
(Continued)

process starting later than the first functional process. The control unit may execute an early start for the second functional process of a working unit, when an actual process value of the preceding first functional process of the program sequence of one of the working units has not yet reached the respective target process value. The control unit may control the early start of the second functional process based on an approximation method for predetermining the temporal end of the first functional process.

25 Claims, 11 Drawing Sheets

(51) Int. Cl.

| | | |
|---|---|---|
| B65B 47/02 | (2006.01) | |
| B65B 9/04 | (2006.01) | |
| B29C 65/18 | (2006.01) | |
| B29C 65/00 | (2006.01) | |
| B65B 31/02 | (2006.01) | |
| B65B 51/10 | (2006.01) | |
| G05B 19/042 | (2006.01) | |
| B65B 51/14 | (2006.01) | |
| B29L 31/00 | (2006.01) | |

(52) U.S. Cl.
CPC ...... *B29C 66/00145* (2013.01); *B29C 66/112* (2013.01); *B29C 66/131* (2013.01); *B29C 66/53461* (2013.01); *B29C 66/81455* (2013.01); *B29C 66/82421* (2013.01); *B29C 66/83221* (2013.01); *B29C 66/849* (2013.01); *B29C 66/9121* (2013.01); *B29C 66/9141* (2013.01); *B29C 66/924* (2013.01); *B29C 66/9221* (2013.01); *B29C 66/9231* (2013.01); *B29C 66/92443* (2013.01); *B29C 66/92921* (2013.01); *B29C 66/944* (2013.01); *B29C 66/953* (2013.01); *B65B 9/04* (2013.01); *B65B 31/022* (2013.01); *B65B 47/02* (2013.01); *B65B 51/10* (2013.01); *G05B 19/0426* (2013.01); *B29L 2031/712* (2013.01); *B65B 51/14* (2013.01); *B65B 2051/105* (2013.01); *G05B 2219/23012* (2013.01); *G05B 2219/45048* (2013.01)

(58) Field of Classification Search
CPC ............ B29C 66/8121; B29C 66/9141; B29C 66/9221; B29C 66/9231; B29C 66/924; B29L 2031/712; G05B 2219/34048
See application file for complete search history.

(56) References Cited

U.S. PATENT DOCUMENTS

| | | | | |
|---|---|---|---|---|
| 4,962,840 | A * | 10/1990 | Miura | A24C 5/35 131/283 |
| 5,966,897 | A | 10/1999 | Kirka et al. | |
| 5,971,905 | A * | 10/1999 | Fukuda | B65B 9/20 493/25 |
| 6,056,109 | A | 5/2000 | Hidai et al. | |
| 6,662,527 | B1 * | 12/2003 | Suga | B29C 65/18 53/374.6 |
| 7,222,626 | B2 | 5/2007 | Focke et al. | |
| 9,031,804 | B2 | 5/2015 | Korajda et al. | |
| 2002/0051833 | A1 | 5/2002 | Shiozaki | |
| 2003/0105545 | A1 * | 6/2003 | Iwasaki | B29C 66/5229 700/115 |
| 2005/0039420 | A1 | 2/2005 | Albritton et al. | |
| 2008/0152767 | A1 * | 6/2008 | Maisel | B65B 25/041 426/118 |
| 2009/0071100 | A1 * | 3/2009 | Ehrmann | B65B 9/04 53/84 |
| 2010/0242416 | A1 * | 9/2010 | Sato | B29C 66/4312 53/494 |
| 2013/0152507 | A1 | 6/2013 | Frazier et al. | |
| 2013/0247521 | A1 * | 9/2013 | May | B65B 57/00 53/473 |
| 2014/0109511 | A1 | 4/2014 | Hammad | |
| 2016/0176598 | A1 * | 6/2016 | Palumbo | B65B 9/045 206/497 |
| 2017/0305586 | A1 * | 10/2017 | Rizzi | B65B 31/028 |
| 2018/0297732 | A1 * | 10/2018 | Hattori | B65B 9/073 |

FOREIGN PATENT DOCUMENTS

| | | |
|---|---|---|
| CN | 102372100 A | 3/2012 |
| CN | 103930349 A | 7/2014 |
| CN | 203845103 U | 9/2014 |
| CN | 104554910 A | 4/2015 |
| DE | 7345840 U | 11/1977 |
| DE | 3739432 A1 | 6/1989 |
| DE | 19735942 A1 | 3/1999 |
| DE | 695 17 697 T2 | 10/2000 |
| DE | 102005059312 A1 | 6/2007 |
| DE | 102006040807 A1 | 3/2008 |
| DE | 102006050417 A1 | 4/2008 |
| DE | 102008024461 A1 | 12/2009 |
| DE | 102009017638 A1 | 10/2010 |
| DE | 102009040977 A1 | 3/2011 |
| DE | 202010017361 U1 | 12/2011 |
| DE | 102012004341 A1 | 9/2013 |
| DE | 102012005179 A1 | 9/2013 |
| DE | 102012005912 A1 | 9/2013 |
| DE | 102013105548 A1 | 12/2014 |
| DE | 10 2007 062 335 B4 | 9/2019 |
| EP | 1225491 A1 | 7/2002 |
| EP | 1316002 A1 | 6/2003 |
| EP | 1 462 894 A2 | 9/2004 |
| EP | 1710074 A1 | 10/2006 |
| EP | 1818159 A2 | 8/2007 |
| EP | 1935787 A1 | 6/2008 |
| EP | 2 241 862 A2 | 10/2010 |
| EP | 2252921 A1 | 11/2010 |
| EP | 2415677 A1 | 2/2012 |
| EP | 2690023 A1 | 1/2014 |
| EP | 2722279 A1 | 4/2014 |
| JP | 04138504 A | 5/1992 |
| WO | 0019278 A1 | 4/2000 |
| WO | 2009/109178 A1 | 9/2009 |

OTHER PUBLICATIONS

Andreas Moser, Nutzung von Prozesswissen beim Thermoformen von Verpackungen, Dec. 6, 2013 (133 Pages).
Andreas Moser, Use of process knowledge in the thermoforming of packaging, Dec. 6, 2013 (150 Pages).
Chinese Third Office Action dated Mar. 5, 2020 (with English Machine Translation), Application No. 201680046290.0, Applicant MULTIVAC Sepp Haggenmueller SE & Co. KG, 24 Pages.
European Communication Application No. 16 758 098.4-1016 dated Mar. 26, 2021, English Machine Translation.
European Communication dated Mar. 26, 2021 (with English Machine Translation), Application No. 16 758 098.4-1016, Applicant MULTIVAC Sepp Haggenmueller SE & Co. KG, 8 Pages.

* cited by examiner

PACKAGING MACHINE HAVING A PROCESS-CONTROLLED EARLY START FUNCTION

FIELD OF THE INVENTION

The present invention relates to a self-controlling packaging machine and a method of using a self-controlling packaging machine.

BACKGROUND OF THE INVENTION

In known packaging machines the production process is composed of a large number of individual processes, such as closing the chamber, heating, molding, evacuating, gas flushing, sealing, opening the chamber, and safety times for allowing sufficient venting of chambers.

The individual processes are there time-controlled, said individual processes taking place in succession, optionally in a temporarily overlapping manner or separated by safety time intervals. The respective process times depend especially on a chamber volume, types of films/foils, sequences of movements and switching times of valves of the packaging machine and, consequently, they must be preset by the machine operators in a complicated process at the control console of the packaging machine for each machine equipment and for each product to be produced.

Setting the respective process times of the packaging machine as well as adapting the respective process times to one another requires a very profound knowledge of the individual processes on the part of the machine operator, and even very experienced machine operators may need a plurality of test runs for the packaging machine until the respective process times have been adjusted such that they are smoothly adapted to one another.

However, when process times of the packaging machine are set, delays often occur, which lead to a substantial reduction of the performance of the packaging machine.

A known molding station is shown in FIG. 7a. It comprises an upper part and a lower part, which is vertically adjustable by means of a lifting mechanism. Between the upper part and the lower part, a heating plate is provided in a molding chamber, said heating plate being used for heating a film section to be shaped. In addition, the upper part and the lower part have provided therein pressure and vent valves so as to press, on the one hand, the film section first against the heating plate and so as to allow, on the other hand, pressure molding of a packaging trough M. These processes are time-controlled according to a preset schedule.

Time-controlled valve switching is illustrated in FIG. 7b. In section AA, the main processes, opening/closing the lifting mechanism, heating and molding are shown. Therebelow, in section BB, preset process times are shown, which are set by the operator in the packaging machine. In section CC, the vent-valve and pressure-valve positions for the upper part and the lower part of the molding station are shown. In section DD, the respective pressure profiles in the upper part and the lower part are shown.

After the molding station has been closed (step A'), pressure is generated in the lower part (step B'). The pressure build-up is time-controlled (step C') and interrupts or ends as soon as the predetermined time has elapsed. Also a preset heating time of the heating plate elapses (step D'). When the heating time has elapsed, the vent valve in the lower part opens (step E') and pressure is built up in the upper part so as to mold the heated film section (step F'). The pressure build-up as well as a stabilization time preset for molding takes place/elapses in a time-controlled manner (steps G' and H'). As soon as the stabilization time has elapsed, the upper vent opens (step I'). Now, a preset safety time at the end of the molding process elapses (step J') before the molding station opens (step K').

The processes opening/closing of the lifting mechanism are position-controlled and heating as well as molding are time-controlled in the case of the upper molding station. Hence, the operator has to input in the control unit a time control schedule for the molding station. Upon creating the time control schedule, the operator cautiously approaches a desired packaging result by several trials. This cautious approach requires a high degree of routine and can only be accomplished by skilled personnel.

DE 10 2009 017 638 A1 discloses a packaging machine, in the case of which process times can be adapted with respect to varying boundary conditions. The respective process times especially depend on the number of the provided products provided to be packed.

EP 1 316 002 B1 discloses a machine tool whose operating sequence can be controlled on the basis of auxiliary data taken from a database.

DE 10 2012 005 912 A1 discloses a method of checking the availability of the components used in a packaging line.

DE 10 2006 040 807 A1 discloses a sealing station for a packaging machine, in which a force sensor is provided in the line of force of the sealing station, said force sensor allowing quality control in real time during the sealing process.

DE 10 2005 059 312 A1 discloses a packaging machine comprising a reading unit for reading machine-relevant information of a replacement part used in the packaging machine.

EP 1 710 074 A1 discloses a packaging machine including a tool, which comprises a sensor chip. Characteristic values of the tool read from the sensor chip can be used for adjusting the packaging machine.

DE 20 2010 017 361 U1 discloses a method by means of which the production process of a meat product can be tracked.

WO 00/19278 A1 does not relate to packaging technology but discloses a printing or copying system, in the case of which the consumption of printer cartridges is controlled and monitored.

DE 10 2008 024 461 A1 discloses a packaging machine comprising a processing station control unit which is connected to a central control unit of the packaging machine.

In the case of a known early start function, which takes place according to a rigid time control, the early start of a process is carried out exclusively with due regard to an associated reaction time (dead time) of a working component before a preceding process is finished. However, a prerequisite for this is that the preceding process has been finished when the early start is started. In a process-controlled packaging machine, however, the respective processes are based on measurement data, i.e. they are so to speak flexible in their operation, so that the known time-controlled early start function will not always work in such machines, in particular not when the process runtime of the preceding process changes.

SUMMARY OF THE INVENTION

It is the object of the present invention to provide a packaging machine with an improved early start function and a method therefor.

This object is achieved by a packaging machine according to claim 1 and by a method according to the independent claim 15. Improved further developments of the invention represent the subject matters of the subclaims.

The present invention relates to a packaging machine comprising a control unit, a plurality of measuring devices as well as a plurality of working units for different processes, wherein the control unit is functionally connected to the working units and the measuring devices. The measuring devices are configured to detect actual process values at the respective working units and to forward them to the control unit, so as to monitor a process status at the respective working units, wherein the control unit is configured to establish in a self-controlling manner, by a comparison of the actual process values forwarded to the control unit from the respective measuring devices and of associated target process values from a memory connected to said control unit, a program sequence for the respective individual working units and/or such that the program sequences of the respective working units are adapted with respect to one another, wherein, according to this program sequence, the respective working units operate, depending on the actual process values detected thereat, individually and/or such that they are adapted with respect to one another.

A work cycle at the packaging machine according to the present invention comprises at least a first functional process and a second functional process at one or at different working units, the second functional process starting later than the first functional process.

According to the present invention, the control unit is configured for executing an early start for the second functional process of a working unit, when an actual process value of the preceding first functional process of the program sequence of the working unit or of another working unit has not yet reached the respective target process value, wherein the control unit is configured for executing the early start based on a predetermined reaction time of the working unit for the second functional process of the program sequence of the working unit.

According to the present invention, the control unit is configured for controlling the early start of the second functional process based on an approximation method for predetermining the temporal end of the first functional process by means of a time-dependent measured variable of the first functional process detected at the working unit by means of one of the measuring devices.

Preferably, the control unit is configured to determine, based on the approximation method, a residual remaining time of the preceding first functional process, said residual remaining time indicating the length of time until the measured variable will reach the target process value, the control unit being additionally configured for executing the early start, when the remaining time is shorter than or equal to the predetermined reaction time.

Preferably, a process-dependent rate of change of a time-dependent measured variable of the first functional process is determinable by means of the approximation method, said measured variable being detected at the working unit by means of one of the measuring devices, or the approximation method is configured to execute an adaptation to a mathematical function. The mathematical function may, as regards its basic type (e.g. exponential function), result from the underlying process. It can be approximated continuously from the measured values and allows, through extrapolation, to predict when a specific target value will presumably be reached and when the process will presumably be finished.

From the rate of change of the detected time-dependent measured variable of the first functional process it can be derived how fast the measured variable changes, i.e. the change of the measured variable per unit time. On the basis of this information, the second functional process can be activated by early start in the program sequence with due regard to the first functional process, i.e. in a process-controlled manner based on the program progress of the latter, so that the respective functional processes can take place within a narrower time window, and this will lead to an improvement in the productivity of the machine.

In contrast to the known time-controlled early start function, the process-controlled early start function according to the present invention also offers the advantage that a change of a production process of different product batches can take place without great effort, as regards the time control, for the setting process at the packaging machine.

Preferably, a threshold value for the rate of change is stored for the control unit, wherein the control unit is configured to start a calculation of the remaining time, when the rate of change corresponds to the threshold value or is smaller than the threshold value.

According to an embodiment, the control unit is configured for determining the threshold value on the basis of a trend control. Preferably, the control unit is configured to increase the threshold value, if the condition that the calculated remaining time is shorter than or equal to the predetermined reaction time is fulfilled without interruption throughout a predetermined number of detected rates of change of the time-dependent measured variable of the first functional process, and/or the control unit is configured to decrease the threshold value, if the condition that the calculated remaining time is longer than the predetermined reaction time is fulfilled without interruption throughout a predetermined number of detected rates of change of the time-dependent measured variable of the first functional process.

Preferably, the control unit is configured to increase or decrease the threshold value step by step until the calculated remaining time is, at least once, shorter/longer than the predetermined reaction time.

According to a variant, the control unit is connected to a circular buffer for specifying the condition.

Preferably, the control unit is configured to continuously execute a calculation of the remaining time and to delay the early start until the calculated remaining time is shorter than or equal to the predetermined reaction time.

According to an embodiment, the time-dependent measured variable is a pressure applied to the working unit, said pressure being detected by means of a pressure sensor formed on the working unit and functionally connected to the control unit, a variation rate of the detected pressure being derivable from the rate of change that can be calculated by means of the control unit.

Preferably, the control unit is configured to determine a regression line from a predetermined number of detected measurement values of the time-dependent measured variable, the rate of change being a slope of the regression line.

The control unit may be configured to determine the reaction time on the basis of a time measurement, the reaction time being specified as the length of time between an activation of a start signal and an adjusting movement thus triggered at the working unit or has already been specified on the basis of a change of a pressure applied to the working unit or a rate of change of the pressure.

Preferably, the control unit is configured to cyclically determine the reaction time in the case of each first functional process, and to calculate an averaged reaction time by averaging a predetermined number of detected reaction times, the early start of the second functional process being executable with respect to said averaged reaction time.

Preferably, the control unit is configured to cyclically determine the reaction time of one or more actuators of a functional process, in particular of a valve used for this purpose, and to calculate, on the basis of a tendency of the determined reaction time, a time of use of the actuator to be expected. Preferably, the time of use to be expected can be indicated to an operator by means of a HMI interface of the packaging machine.

According to a variant, the control unit comprises an emergency control for operating the packaging machine, the control unit being configured to replace the process-data-based control of the packaging machine by a time-based control, when a predetermined number of calculated reaction times reaches or exceeds a functional threshold value during the operation of the packaging machine.

Preferably, the packaging machine is a thermoform packaging machine, a tray sealer or a belted chamber machine.

Preferably, the target process values are an optimum molding and/or sealing temperature, an optimum heating, sealing and/or molding pressure, and/or at least one stabilization time for a working unit configured as a molding station.

Preferably, the respective measuring devices comprise at least a force, pressure, position, temperature, infrared, ultrasonic, induction, laser and/or moisture sensor.

Preferably, the control unit is configured to execute the automatic early start function at a plurality of working units for various functional processes, in particular for a feed control of a conveyor belt of the packaging machine, for a heating process at a molding station or the sealing station, for various lifting processes of a lifting mechanism of the molding station or the sealing station, for a molding process of the molding station, for a gas-flushing process at the sealing station, for various pressure generation processes at the molding station or the sealing station, for a cutting process and/or for a transfer process by means of a picker for transferring finished products. In the event that the early start function is executed at a plurality of working units, a measurement-data-based program sequence can adapt the respective working steps at the individual working units and/or the respective program sequences of the respective working units with respect to one another.

It is also imaginable that the control unit is configured to execute the early start function between respective functional processes of different working units, e.g. between a molding station and a sealing station.

The principle of early start execution according to the present invention can be realized arbitrarily at and between different working units of the packaging machine, so that a productivity-increasing functional linking of the respective functional processes can be accomplished.

In addition, the present invention relates to a method of self-controlling a program sequence of a process at different working units of a packaging machine, wherein according to the program sequence one process and/or according to the program sequence a plurality of processes that are functionally adapted to one another are executed at the respective working units while the packaging machine is in operation, wherein actual process values are detected at the respective working units and forwarded to a control unit of the packaging machine, wherein the control unit compares the actual process values forwarded thereto with associated target process values and establishes as a result, in a self-controlling manner, the respective program sequence for the individual working units and/or such that the program sequences of the respective working units are adapted with respect to one another, and coordinates on the basis thereof the operation of the packaging machine, wherein within a work cycle at the packaging machine at least a first functional process and a second functional process take place at one or at different working units, the second functional process starting later than the first functional process, wherein the control unit executes an early start for the second functional process of the program sequence of a working unit, if an actual process value of the first functional process of the program sequence of the working unit or of another working unit has not yet reached the respective target process value, wherein the control unit executes the early start based on a predetermined reaction time of the working unit for the second functional process of the program sequence of the working unit, and wherein the control unit controls the early start of the second functional process based on an approximation method for predetermining the temporal end of the first functional process by means of a time-dependent measured variable of the first functional process detected at the work station by means of one of the measuring devices.

Preferably, the control unit determines, based on the approximation method, a residual remaining time of the first functional process, said residual remaining time indicating the length of time until the measured variable will reach the target process value, the control unit additionally initiating the early start at the latest, when the remaining time is shorter than or equal to the predetermined reaction time.

Preferably, the approximation method determines a rate of change of the measured variable of the first functional process detected at the work station or executes an adaptation to a predetermined mathematical function (see above).

According to a variant, the control unit determines a threshold value for the rate of change, wherein the control unit starts a calculation of the remaining time, when the rate of change corresponds to the threshold value or is smaller than the threshold value.

Preferably, the control unit calculates the threshold value on the basis of a trend control. Preferably, the control unit increases the threshold value, if the condition that the calculated remaining time is shorter than or equal to the predetermined reaction time is fulfilled without interruption throughout a predetermined number of detected rates of change of the time-dependent measured variable of the first functional process, and/or the control unit decreases the threshold value, if the condition that the calculated remaining time is longer than the predetermined reaction time is fulfilled without interruption throughout a predetermined number of detected rates of change of the time-dependent measured variable of the first functional process.

Preferably, a pressure applied to the working unit is detected by means of a pressure sensor formed on the working unit and functionally connected to the control unit, the control unit specifying a variation rate of the detected pressure as a rate of change and the remaining time being determinable by the control unit on this basis.

The control unit measures the time-dependent measured variable preferably at intervals, preferably at constant intervals of 1 to 50 milliseconds.

According to an embodiment, a sealing process at a sealing station configured as a working unit is initiated by the early start, and the detection of the pressure inside the sealing station is carried out during an evacuating process and/or gas-flushing process preceding the sealing process.

Preferably, the control unit determines the reaction time based on a time measurement, wherein the reaction time is specified as the length of time between an activation of a start signal and an adjusting movement thus caused at the drive unit or has already been specified on the basis of a change of a pressure applied to the working unit or a rate of change of the pressure.

Primarily, the control unit cyclically determines the reaction time in the case of each cyclically repeated second functional process, and determines an averaged reaction time by averaging a predetermined number of detected reaction times, the early start of the second functional process being executed with respect to said averaged reaction time.

Preferably, the control unit cyclically determines the reaction time of one or more actuators of a functional process, in particular of a valve used for this purpose, and calculates therefrom on the basis of a tendency of the respective measured values of the determined reaction time a time of use of the actuator to be expected. Preferably, the time of use to be expected is indicated to the operator by means of a HMI interface of the packaging machine.

Preferably, the control unit executes an emergency control for operating the packaging machine, the control unit replacing the process-data-based control of the packaging machine by a time-based control, when a predetermined number of calculated reaction times reaches or exceeds a functional threshold value during the operation of the packaging machine.

In the case of one or a plurality of embodiments of the present invention, the packaging machine according to the present invention as well as the method therefor are, in contrast to known time-controlled packaging machines, process-controlled by means of intelligent sensor and control technology. The respective working processes are monitored in particular by means of sensors and controlled depending on the thus detected values. In the case of a preferred packaging machine, the program sequence of the working units used thereat is no longer primarily bound to process times preset by the operator, but is adapted to the current production process during operation, in particular to the measurable progress of the process at the respective working units. In so doing, it is primarily monitored how far actual process values have progressed at the respective working units with respect to predetermined or calculable target process values. Rigid process times, which have been manually preset, as before, at the machine by the operator, are primarily no longer taken into consideration, since the respective processes at the working units last until one or a plurality of target process values has been reached, i.e. the respective processes are sensor-controlled.

If at all, the present invention uses process times which can be retrieved automatically from a memory and which can be generated on the basis of specific production parameters concerning the product, the tool and/or the packaging material. Hence, the packaging machine can be adapted fast in the case of a tool change and/or a product change, without the operator needing a long time for resetting the packaging machine. It follows that, according to the present invention, the packaging machine itself adapts its operation in the best possible way.

To this end, the packaging machine comprises a control unit, a plurality of measuring devices as well as a plurality of working units for different processes, the control unit being functionally connected to the working units and the measuring devices. The measuring devices are configured to detect actual process values at the respective working units and to forward them to the control unit, so as to monitor a process status at the respective working units. The control unit is configured to establish in a self-controlling manner, by a comparison of the actual process values forwarded to the control unit from the respective measuring devices and of associated target process values, in particular an associated target process value range, from a memory connected to said control unit, a program sequence for the respective individual working units and/or such that the program sequences of the respective working units are adapted with respect to one another. The respective working units can then operate, depending on the actual process values detected thereat, individually and/or such that they are adapted with respect to one another.

Self-controlling in the sense of the present invention means that the program sequence at least one working unit does not take place according to a preset process time. The program sequence at a working unit, however, adapts itself with respect to the actual process values detected thereat, i.e. it is sensor-controlled. In the case of the present invention, the control unit operates as a functional link between the measuring devices and the working units. Preferably, the detected actual process values are forwarded to the control unit by the measuring devices, said control unit controlling, with respect to the actual process values, the respective program sequences for the individual working units and/or such that these program sequences are adapted with respect to one another.

In particular, a process at a working unit may start when a functionally preceding working unit reaches at least a process value corresponding to a target value. In particular the sequence of the program sequences of the individual working units can thus be well adapted to one another. The present invention allows the establishment of a functional link between the individual working units, so that the respective working units will be able to operate without any interruption in immediate succession.

In addition, the present invention allows, by means of the actual-process-value determination at the respective working units, an early-start determination of individual working units. This is based on the fact that a certain reaction time is required for actuating the valves and/or for generating control signals, said reaction time being also referred to as dead time among those skilled in the art skilled in the art. In order to reduce such dead times, the present invention allows to start, based on the actual-process-value determination, at least the sequence of operations of a working unit prematurely, i.e. a certain period of time before the target process value is reached. This leads, on the whole, to a saving of time, since the respective working processes are better adapted to one another as regards their sequence.

Preferably, the packaging machine differs from the prior art substantially insofar as it is no longer operated in a time-controlled manner according to a preset rigid program sequence, i.e. with specific process times for the respective working units. The packaging machine according to the present invention is, however, able to adapt, in a production-precise manner, by means of the sensors and the control provided thereat, the respective processes of the working units to the current actual process values detected at these working units, independently of how long the process in question has already been carried out. The respective processes can thus be executed in the best possible way as regards cost effectiveness and may possibly take place in a mutually adapted fashion such that, on the whole, larger batch sizes can be produced within shorter cycle times. In addition, the same quality can thus be produced for all the products.

In contrast to the prior art, the performance of the packaging machine depends, in the case of variants according to the present invention, no longer on the setting skills of the machine operator, but on the technical capabilities of the packaging machine itself, i.e. the capability of adapting itself to the production process, i.e. to the current process values detected at the working units, in a self-controlling manner.

The packaging machine according to the present invention proved to be particularly advantageous for the starting phase of a production process, since test runs for optimally setting the packaging machine are thus no longer necessary. On the contrary, the packaging machine according to the present invention allows, from the very beginning, an optimum production of the products to be produced, since the sequences of the respective processes at the working units can immediately be controlled by means of the control unit in a feedback control with respect to the actual process values detected at the working units.

Due to the fact that the packaging machine itself is configured for optimizing the processes executed thereat, the cyclic output will be increased, while personnel costs can be reduced.

Preferably, the packaging machine comprises at least one robot configured as a working unit. This robot is especially used as a placer for packages to be filled. The operation of the robot may, according to the present invention, be adapted to the sequence of operations of other working units. In particular, accelerations carried out by the robot arm can be adapted with respect to the progress of other working units at the packaging machine.

According to an embodiment of the present invention, the packaging machine may be configured as a thermoform packaging machine, a tray sealer or a belted chamber machine. In view of the fact that in such packaging machines a plurality of working processes takes place, in particular in a mutually adapted fashion, the self-controlling feedback can be used in a particularly performance increasing manner on the basis of the control unit of the packaging machine according to the present invention. These packaging machines are then able to automatically control their production process in a self-controlling manner, without having to resort primarily to preset process working time cycles. It is thus also possible to enormously reduce changeover times at such machines.

Preferably, the memory connected to the control unit serves especially as a data reservoir from which the control unit receives the target process values so as to carry out, as soon as possible after the detection of the actual process values, a feedback control of the respective working units.

In particular, the memory may be configured as a database, preferably as a knowledge database, which is configured to derive the target process values for the respective working units with respect to data of a product to be produced by means of the packaging machine. Preferably, the product to be produced, in particular a film specification, a type of tool and/or a food product to be packed, can be retrieved via an input panel of the packaging machine and, based on this setting, a special data set of target process values can be made available to the control unit for the production process through the memory, in particular the database comprised therein. This would have the advantage that, upon starting production, the machine operator only has to select on the input panel of the packaging machine the product to be produced, whereupon the production process will be taken over by the packaging machine in a self-controlling manner.

A particularly versatile use of the database will be possible, when the latter is configured as a component part of a database system, said database system additionally comprising a database management unit configured for a bidirectional exchange of data between the control unit and the database. The database management unit may not only be used for ascertaining and/or reading, on the basis of the actual process values detected at the working units, the relevant target process values from the database, but in addition it may also be used for executing, in particular on the basis of the control unit, control functions at the database, so that e.g. data sets stored in the database can be corrected, adapted and/or replaced. When, for example, a new product is to be produced, which has not been produced previously by the packaging machine according to the present invention, the packaging machine could then easily be adapted to such a new product. Updates of the data sets stored in the database could be uploaded to the database via a VPN connection, a wireless connection, e.g. by means of RFID, or from an USB stick.

Preferably, the processes at the packaging machine are controlled primarily by format-, process- and/or film-dependent information. Film-dependent information concerns especially a forming depth, a sealed seam width, a final vacuum during sealing, a number of packages, a package size and/or a molding depth. Process-dependent information primarily consists of a specific molding pressure, a specific sealing pressure, a cutting time, maximum admissible early start times concerning the opening and closing of a lifting mechanism and/or maximum admissible early start times concerning the film feed. Film-dependent information consists in particular of a film type, a sealing layer, a film thickness, a sealing layer thickness, a cooling time (stabilization time) in the mold, an ideal heating time, an ideal sealing time, an ideal heating temperature during molding and preheating and/or an ideal heating temperature during sealing. In particular, the control unit is configured to produce, based on the format-, process- and/or film-dependent information, the target process values and/or the control signals for the production process. Preferably, the target process values are based on data of the product to be produced, said data indicating for this product in particular a sealing area, a sealing pressure, a final vacuum, a type of film and/or a film thickness or a film specification, such as the layer structure.

Preferably, information concerning the film specification may be stored in the database by means of a wireless connection. In particular, the information may be read via the film material from an RFID tag attached to the film by means of an RFID reader provided on the packaging machine, and stored in the database by said RFID reader.

For each product to be produced, there is preferably a preselection of specific target process values, which are available to the process-guided self-controlling function of the packaging machine during operation. The program sequences at the respective working units are therefore adaptable with respect to the predetermined target process values.

Preferably, the target process values indicate an optimum molding and/or sealing temperature, an optimum sealing and/or molding pressure, and/or at least a stabilization time for a working unit configured as a molding station. When the predetermined optimum target process value or values has/have been reached, the control unit can decide when the process at a working unit can be finished and a subsequent process can be started at the same working unit or at some other working unit, so as to control the program sequence with smooth transitions between the processes of the respective working units.

According to an embodiment variant, the memory is configured such that it is integrated in the control unit or it is, alternatively, provided as an external unit. When the memory is configured such that it is integral with the control unit, it can be controlled directly via a control console of the packaging machine. This variant primarily allows data sets stored in the memory to be updated, replaced and/or supplemented by means of the control console. In particular as an external unit, the memory may be functionally connected to a plurality of packaging machines, and the respective control units of the plurality of packaging machines may be able to functionally access the memory configured as an external unit. This will particularly make sense in the event that a plurality of packaging machines operate in parallel in a production hall, without it being absolutely necessary that each of the respective packaging machines is equipped with a memory of its own. It would also be imaginable that the plurality of packaging machines resort to different data sets. In this context, it would be imaginable that different production processes take place on the packaging machines.

Preferably, the memory is adapted to be functionally connected to an external network, the memory being then adapted to be updated and/or actuated via the external network. It would be imaginable that e.g. a machine operator uploads, from his computer workstation, data sets to the memory via the external network into which his computer is functionally incorporated. It would also be imaginable that the external network is used by the manufacturer of the packaging machine for actuating the memory of the packaging machine, although the latter has already been incorporated in the production at the food packaging firm. On the basis of this variant, arbitrary data could be read from the memory, e.g. also error reports, operating statuses, production data and/or server data.

Preferably, the respective measuring devices comprise at least a force, pressure, position, temperature, infrared, ultrasonic, induction, laser and/or moisture sensor. The respective sensors are installed in the working units especially as integral components thereof, so as to detect as precisely as possible the actual process values at these working units. Preferably, the sensors used detect the respective actual process values continuously during the operation of the packaging machine, so that, when a target process value has been reached, the control unit will be able to react fast so as to finish the process, if necessary, and start a subsequent process.

Preferably, at least one of the working units comprises a movable lower part and an upper part, which enclose therebetween a molding chamber or a sealing chamber and which each comprise at least one pressure gage. The latter can be used for monitoring the pressure profiles within the upper part and the lower part during the production process. The control unit can here carry out a control of pressure generation depending on the pressure profiles. Likewise, the control unit may control other processes within the molding chamber or the sealing chamber depending on the pressure profiles.

According to an embodiment, one of the working units of the packaging machine is configured as a molding station, which comprises at least one heating plate. The latter serves to heat a film section introduced in the molding station, so that said film section can easily be shaped subsequently. It will be of advantage when a function of the heating plate is controllable based on pressure values detected within the molding station, in particular when a heating time of the heating plate can be controlled depending on a pressure level that has been reached within the molding station.

According to a variant, the molding station comprises a heating chamber and a molding chamber, which are defined such that they are spaced apart from each other. The heating chamber serves here as a preheating unit and comprises preferably a lower and an upper heating plate, between which a film section can be clamped in position. In order to generate a particularly strong clamping force, a pressure generator, in particular an inflatable membrane, may be arranged above the upper heating plate. This pressure generator is able to press the upper heating plate downwards.

It is imaginable that one of the working units is configured as a sealing station. The latter may optionally be provided with a gas-flushing unit, so as to create a desired atmosphere for the product to be sealed.

Preferably, the actual process value is a pressure, which is detected in the working unit, the control unit being configured to finish or to start at least one working process at the working unit or at least one other working unit, when the detected pressure has reached a predetermined pressure level. The working process may e.g. be a heating or a cooling process, which takes place in accordance with a heating or cooling time taken from the memory.

Preferably, the present invention also relates to a method of self-controlling a program sequence of a process at different working units of a packaging machine. According to the program sequence, one process and/or a plurality of processes that are functionally adapted to one another are executed at the respective working units while the packaging machine is in operation, wherein actual process values are detected at the respective working units and forwarded to a control unit of the packaging machine, wherein the control unit compares the actual process values forwarded thereto with associated target process values and establishes as a result, in a self-controlling manner, the respective program sequence for the individual working units and/or such that the program sequences of the respective working units are adapted with respect to one another, and coordinates on the basis thereof the operation of the packaging machine.

The operation of the packaging machine preferably depends on the actual process values detected at the respective working units. With due regard to target process values for the product to be produced, it can, taking the detected actual process values as a basis, then be determined by means of the control unit whether the respective process at a working unit may continue or may be interrupted and whether a subsequent process may possibly be allowed to start. It follows that the self-control of the packaging machine depends, on the one hand, on the sensors provided at the respective working units such that they are integral therewith and, on the other hand, on the feedback control function with due regard to target process values, said target process values being made available to the control unit especially by a memory connected to the control unit.

On the basis of the method according to the present invention, the respective program sequences of the processes executed at the working units can be adapted during operation, taking into account the actual process values measured at the working units. The sequence of processes is no longer fixedly time-controlled, but is controlled in a self-controlling manner as a function of actual process values that have been measured and reached.

It follows that, in the case of the present invention, starting a process at a working unit depends primarily on the actual process values measured in the process preceding the process in question in the production process and/or at least one working unit operating at least partially simultaneously. Preferably, the process at a working unit will start, when, in a process of the working unit or of the at least one other working unit preceding the process in question in the production process, the detected actual process value or values corresponds/correspond to the predetermined target process values. Of course, it may also be such that the respective processes take place, from the point of view of time, in an overlapping fashion, so to speak parallel to one another, or separately from one another over an interval in time. Hence, it may happen that the process of a working unit is already started, when one or a plurality of specific actual process values in the process preceding the process of this working unit have not yet reached the target process values. This can especially result in an avoidance of dead times, whereby the cycle times can be reduced. In the case of temporally spaced processes which take place in succession, it would be possible that, when the target process value is reached in a process of a working unit, the subsequent process will not be started until a predetermined time interval has elapsed.

Hence, the respective processes at the working units can be optimized individually, as regards their process sequence, by means of sensors and feedback control, the respective optimized program sequences of the processes being also used for optimizing the other processes of the method, so that the entire program sequence of the method of the packaging machine can be optimized, depending on the respective processes.

Other aspects and advantages of the present invention will be apparent from the following detailed description of the preferred embodiments and the accompanying drawing figures.

DESCRIPTION OF THE SEVERAL VIEWS OF THE DRAWING

In the following, an advantageous embodiment of the present invention will be explained in more detail making reference to a drawing, in which the individual figures show:

FIG. 4b is a schematic view of a process diagram for the molding station of FIG. 4a;

FIG. 5b is a schematic view of a process diagram for the molding station of FIG. 5a;

FIG. 6b is a schematic view of a process diagram for the sealing station of FIG. 6a;

FIG. 7b is a schematic view of a time-controlled process diagram for the prior art molding station of FIG. 7a.

DETAILED DESCRIPTION OF THE INVENTION

Figure 1:
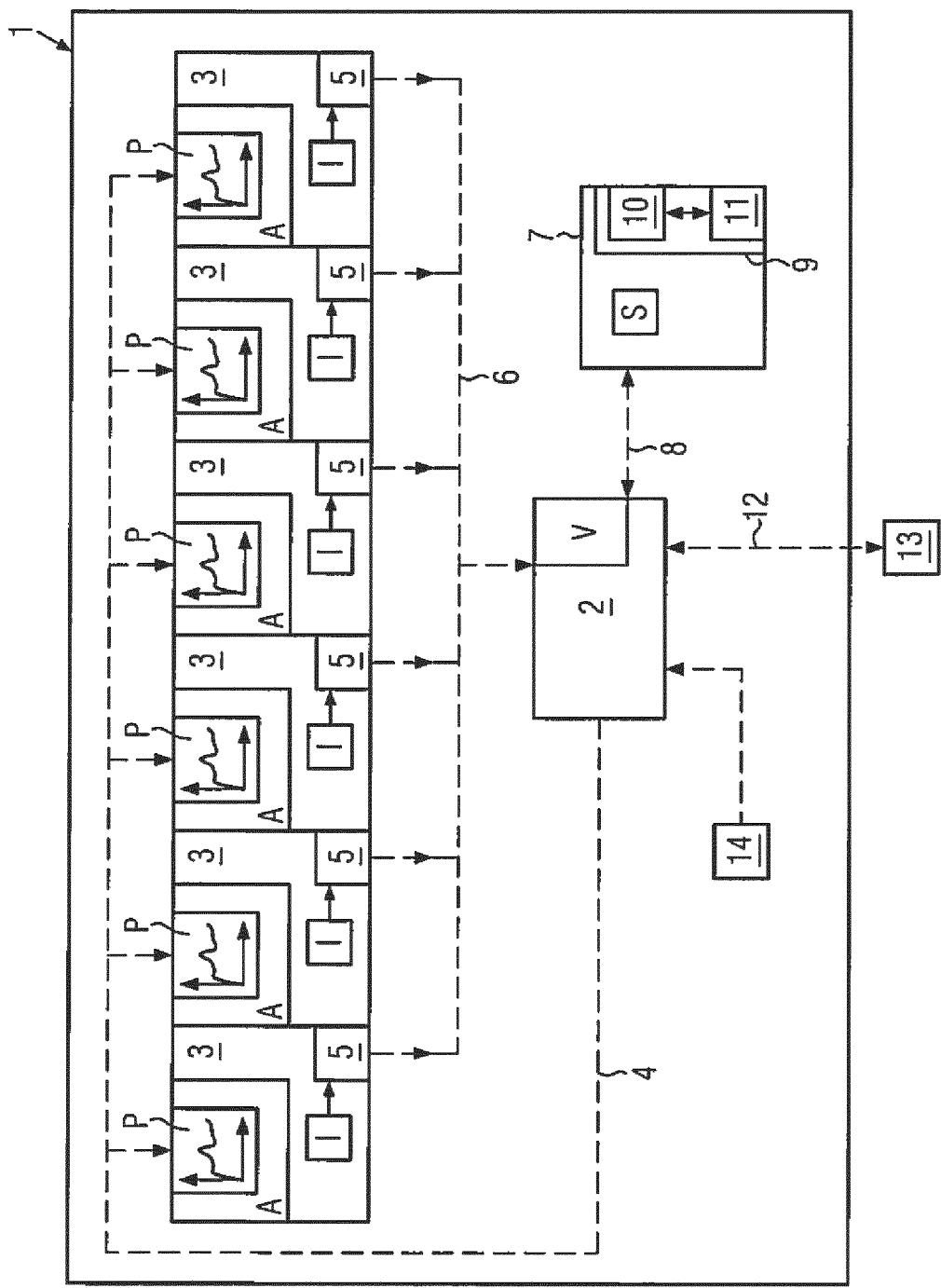
FIG. 1 is a schematic view of one embodiment of a packaging machine accordance with the teachings of the present disclosure.

The invention will now be described with reference to the drawing figures, in which like reference numerals refer to like parts throughout. For purposes of clarity in illustrating the characteristics of the present invention, proportional relationships of the elements have not necessarily been maintained in the drawing figures.

The following detailed description of the invention references specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The present invention is defined by the appended claims and the description is, therefore, not to be taken in a limiting sense and shall not limit the scope of equivalents to which such claims are entitled.

FIG. 1 shows in a schematic representation a packaging machine 1 according to the present invention. For controlling the production process, the packaging machine 1 comprises a control unit 2. Furthermore, the packaging machine 1 comprises a plurality of working units 3, each connected to the control unit 2 by means of a functional connection 4. The working units 3 are work stations configured for different processes, so as to produce the desired product. During the production process, the respective working units 3 operate in a coordinated fashion with respect to one another. In so doing, the respective working units 3 may, from the point of view of time, operate in succession and/or so to speak parallel to one another, i.e. in an overlapping mode.

According to FIG. 1, the packaging machine 1 comprises a plurality of measuring devices 5 which are installed in the respective working units 3. The measuring devices 5 are configured for detecting actual process values I at the respective working units 3. In addition, FIG. 1 shows that the respective measuring devices 5 are connected to the control unit 2 via a further functional connection 6. This further functional connection 6 allows the measuring devices 5 to forward the detected actual process values I to the control unit 2. In this way, the respective current process statuses of the working units 3 during the production process can be monitored by means of the measuring devices 5 used.

FIG. 1 also shows that the control unit 2 is connected to a memory 7. According to FIG. 1, the memory 7 is configured as part of the packaging machine 1, but it could just as well be connected to the control unit 2 of the packaging machine 1 as an external unit. The memory 7, which also comprises a database, is configured for providing target process values S. The target process values S depend in particular on specific data of the product to be produced. The target process values S may e.g. result from a film thickness, a type of film, a sealing area, a sealing pressure, a final vacuum to be evacuated and/or a product to be packed. It follows that for each product to be produced, which consists essentially of the product to be packed as well as of the package for the product, different process values S from the memory 7 can be made available.

According to FIG. 1, the control unit 2 is able to access the target process values S from the memory 7 via a data connection 8. The data connection 8 is especially configured for bidirectional data traffic between the control unit 2 and the memory 7.

Furthermore, FIG. 1 shows that the control unit 2 is configured for generating a program sequence P for the respective working units 3 by executing a comparison V between the actual process values I forwarded to the control unit 2 from the respective measuring devices 5 and the associated target process values S from the memory 7 connected to the control unit 2. The program sequence P of the respective working units 3 is provided for actors A formed on the working units 3. The actors A execute at the respective working units 3 a special kind of work, e.g. transport, molding and/or gas-flushing operations, on the product to be produced.

On the basis of the detected actual process values I (distance, pressure, vacuum, temperature, etc.) and the comparison of these values with the target process values S from the memory 7, the control unit 2 according to the present invention initiates a functional feedback, so as to coordinate the actors A provided on the respective working units 3 in a self-controlled manner according to the program sequence P created by the control unit 2. The control unit 2 is configured to coordinate the respective program sequences P for the respective actors A of the individual working units 3 and/or to control the respective program sequences P in a self-controlling manner such that they are adapted to one another, so as to guarantee a smooth and economical operating sequence of the packaging machine 1.

In particular, the control unit 2 may, according to an embodiment of the present invention, be configured to control the program sequence P of at least one working unit 3 depending on the progress of another program sequence of at least one other working unit 3. In so doing, the control unit 2 could ensure that the program sequence P of at least one working unit 3 is started when a predetermined actual process value I is detected at least one other working unit 3. The respective program sequences P can thus be coordinated in a well-matched manner, the function of the latter depending on the respective detected actual process values at the working units 3 as well as on the functional feedback in response thereto. It follows that the packaging machine 1 according to the present invention is configured for coordinating in a self-controlling manner the respective program sequences executed thereon, and this is especially done in real time, without the necessity of adjusting any specific values or operational sequences on the packaging machine through a machine operator.

In addition, FIG. 1 shows that the memory 7 comprises a database system 9, which is preferably equipped with a database 10 as well as with a database management unit 11. The database 10 may have stored therein specific data sets for the respective products to be produced. These data sets are in particular the respective target process values. Likewise, the database 10 may have stored therein special product characteristics, on the basis of which the database management unit 11 derives the target process values S.

FIG. 1 also shows that the control unit 2 may be functionally connected to an external network 13 via a wireless data connection 12. The external network 13 may be a computer network from which the control unit 2 can be controlled. Furthermore, the control unit 2 may be configured for being controlled from the external network 13 and for controlling in response thereto the memory 7, e.g. for updating and/or supplementing the data sets stored in the database 10. Optionally, the memory 7, and especially the database 10 comprised therein, could also be controlled via the control unit 2, also by means of a control console 14 provided directly on the packaging machine 15.

Figure 2:
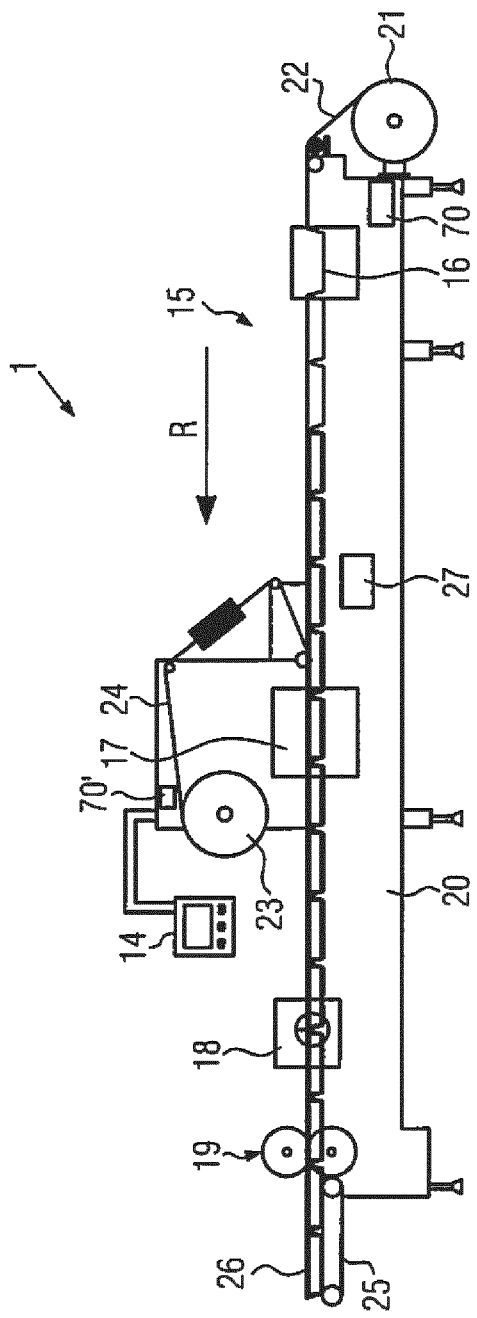
FIG. 2 is a schematic side view of a thermoform packaging machine in accordance with the teachings of the present disclosure.

In FIG. 2, the packaging machine 1 according to the present invention is configured as a thermoform packaging machine 15. The thermoform packaging machine 15 comprises a molding station 16, a sealing station 17, a cross cutting station 18 as well as a longitudinal cutting station 19, which are arranged on a machine frame 20 in a working direction R in this sequence. On the input side, the machine frame 20 has provided thereon a supply roll 21 from which a film web 22 is unwound. In the area of the sealing station 17, a material storage unit 23 is provided, from which a cover film 24 is unwound. On the output side, a discharge device 25 in the form of a conveyor belt is provided at the thermoform packaging machine 15, with which finished, singulated packages 26 are transported away. Furthermore, the thermoform packaging machine 1 comprises a schematically shown film feeding device 27, which grips the film web 22 and transports it in each main work cycle in the working direction R. The film feeding device 27 is e.g. configured as a transport chain arranged on one side or on both sides at the film web 22. Furthermore, FIG. 2 shows an RFID reader 70, 70' that is configured for detecting information of an RFID tag, which is not shown and which is fixed to the bottom film/foil 22 or the cover film 24. The information read consists in particular of film specifications.

The principle according to the present invention, which has been described hereinbefore in connection with the general representation of the packaging machine 1 shown in FIG. 1, can be applied to the thermoform packaging machine 15 according to FIG. 2. In the case of the thermoform packaging machine 15 according to FIG. 2, in particular in the molding station 16 as well as the sealing station 17 may be used as functionally controlled working units 3 of the type explained in connection with the packaging machine 1 according to FIG. 1, without this implying any limitation.

The molding station 16 is particularly suitable for process control according to the present invention. This will be explained in more detail hereinafter on the basis of different embodiments according to FIGS. 4a, 4b, 5a and 5b. Furthermore, it will be described in connection with FIG. 6 how the inventive principle can be applied to the sealing station 17. The sealing station 17, considered individually, may comprise a plurality of working units 3, e.g. a sealing tool, a gas-flushing tool, an evacuating tool and/or means of transport provided separately therefor, said components operating individually according to self-controlling program sequences and/or such that they operate in a coordinated manner with respect to one another. A sealing station 17 according to the embodiment in question will be described hereinafter in connection with FIGS. 6a and 6b.

It follows that, according to the present invention, the processes executed in the thermoform packaging machine 15 at the respective working units 3 will no longer take place in a primarily time-controlled manner, but in a self-controlling fashion, process-oriented as a function of actual process values I measured at these working units 3 and reached.

Figure 3:
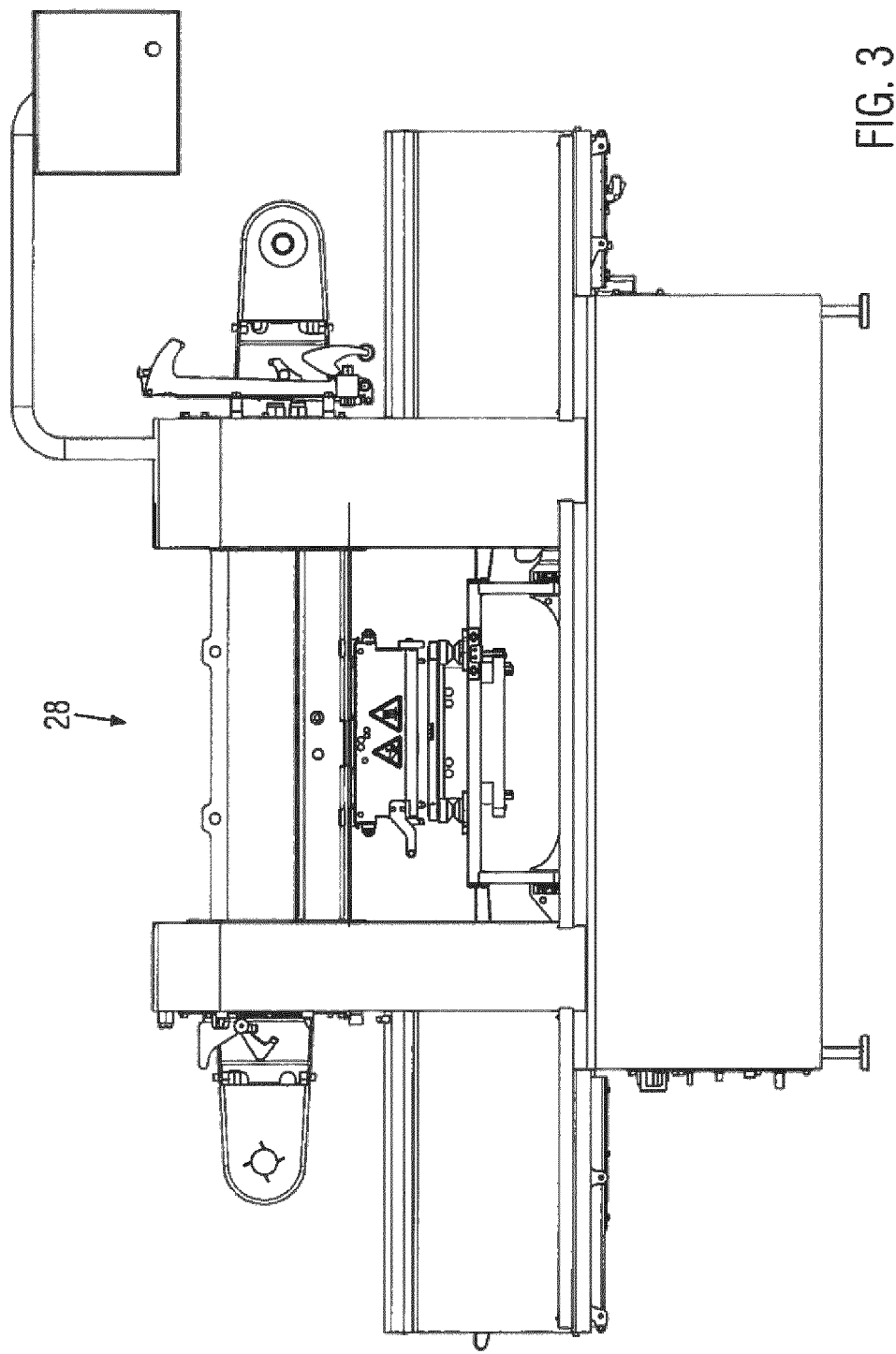
FIG. 3 is a front view of one embodiment of a tray sealer in accordance with the teachings of the present disclosure.
Figure 7A:
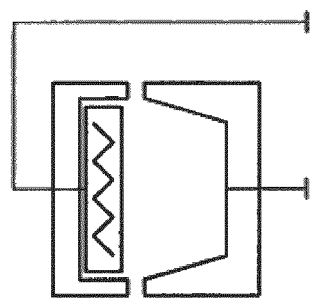
FIG. 7a is a section view of one embodiment of a molding station known in the prior art.

According to FIG. 3, the packaging machine 1 according to the present invention is configured as a tray sealer 28. The inventive principle of the self-controlling packaging machine 1 described hereinbefore in connection with FIG. 1 can also be applied to the tray sealer 28.

Figure 4A:
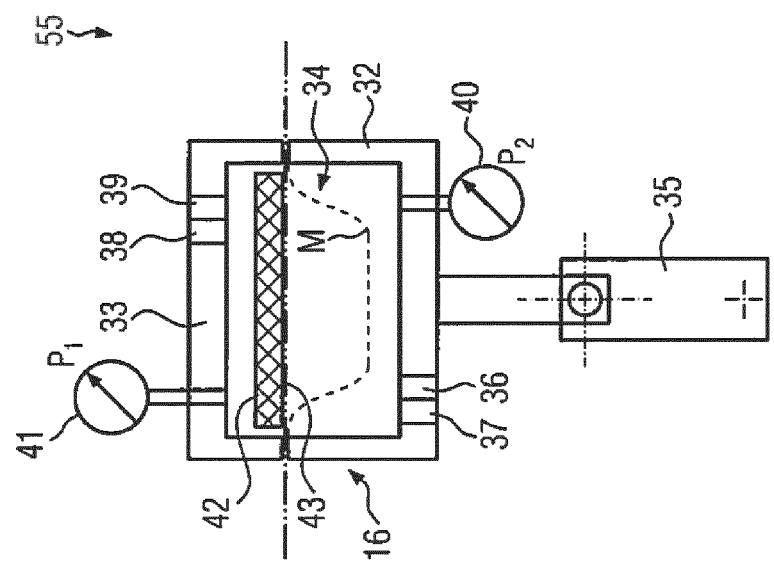
FIG. 4a is a section view of one embodiment of a molding station in accordance with the teachings of the present disclosure.
Figure 4B:
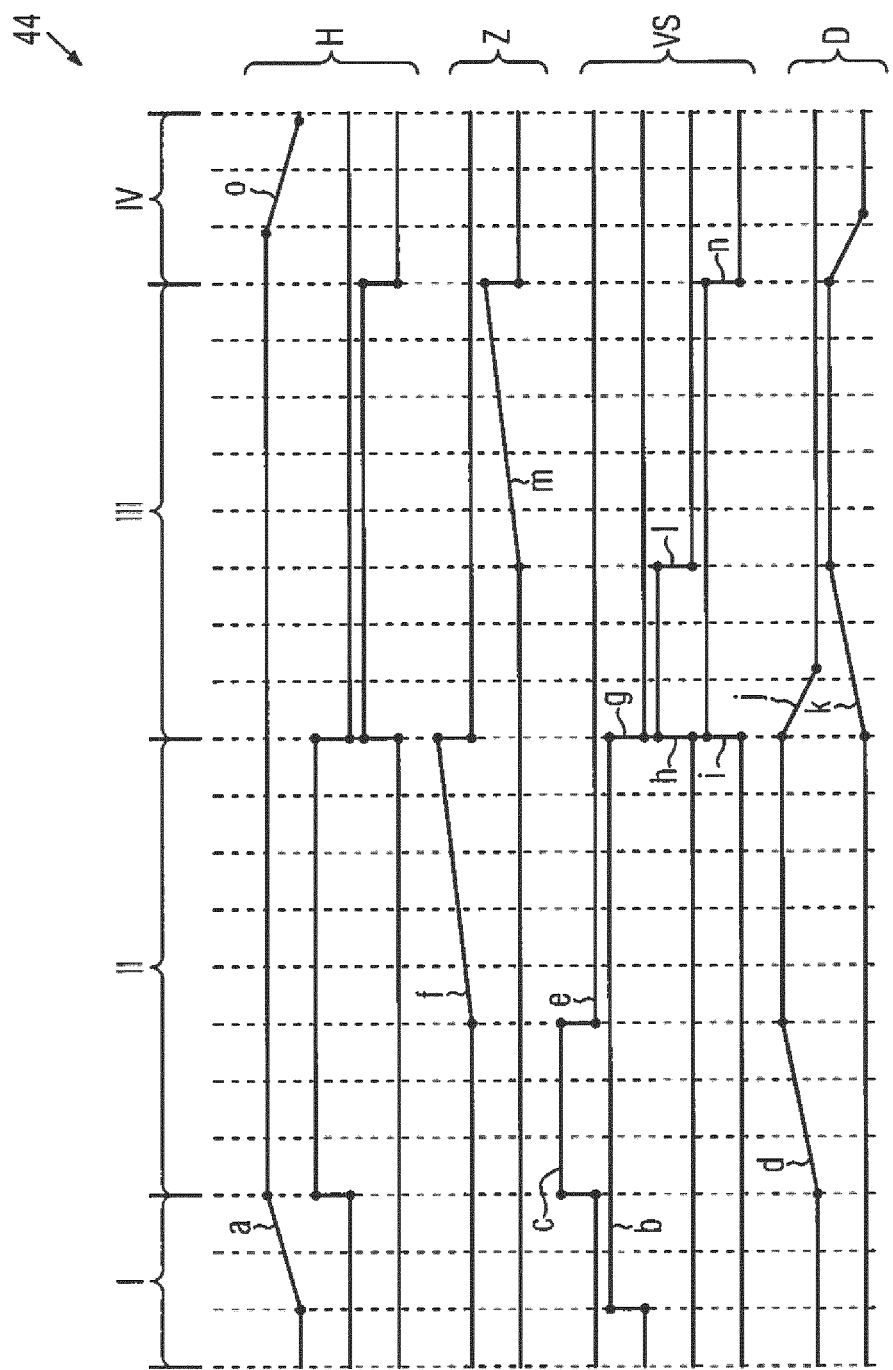

FIG. 4a shows the molding station 16 according to an embodiment variant. The process mode of the molding station 16 shown in FIG. 4a is shown in FIG. 4b.

The molding station 16 according to FIG. 4a comprises a lower part 32 and an upper part 33. Between the lower part 32 and the upper part 33, a molding chamber 34 is defined for forming packaging troughs M. The lower part 32 is connected to a lifting mechanism 35, which supports the lower part 32 relative to the upper part 33 in a vertically adjustable manner. The lower part 32 has provided therein a lower pressure valve 36 and a lower vent valve 37. The upper part 33 has provided therein an upper pressure valve 38 and an upper vent valve 39.

FIG. 4a also shows that the lower part 32 has provided therein a lower pressure gage 40 and the upper part 33 has provided therein an upper pressure gage 41 as a measuring device 5. The lower and upper pressure gages 40, 41 are functionally connected to the control unit 2 of the packaging machine 1.

In addition, a heating plate 42 is arranged inside the molding chamber 34 according to FIG. 4a. Below the heating plate 42, a film section 43 is positioned, which is clamped in position between the lower part 32 and the upper part 33. In the molding chamber 34, the film section 43 is first heated by means of the heating plate 42 and, subsequently, it has imparted thereto a desired shape by means of suitable pressure generation and/or vacuum generation within the molding chamber 34, so as to produce the packaging troughs M. This will be explained in more detail on the basis of FIG. 4b.

FIG. 4b shows a process diagram 44 for the process-controlled process mode of the molding station 16 according to the present invention, said molding station 16 being depicted in FIG. 4a. The process diagram 44 shows, in a vertical arrangement, main processes H, process times Z, a valve control sequence VS and pressure profiles D occurring, process-controlled relative to one another, at the molding station 16 for producing packaging troughs M. In a horizontal arrangement, the process diagram 44 is subdivided in terms of time into process blocks I to IV.

In process block I, the molding station 16 shuts in the film section 43 between the lower part 32 and the upper part 33. To this end, the lifting mechanism 35 displaces the lower part 32 relative to the upper part 33 from an open position to a closed position (step a). The lower vent valve 37 is moved to a closed position (step b).

In process block II, the molding station 16 is closed. Process block II comprises heating of the clamped film section 43, so that the latter can then be deformed more easily. In the lower part 32, pressure is first generated, whereby the film section 43 is pressed against the heating plate 42 (step c). The pressure rise in the lower part 32 is monitored by means of the lower pressure gage 40 (step d).

Furthermore, the pressure supply in the lower part 32 is interrupted in process block II (step e) and heating of the heating plate 42 is started in accordance with a heating time (step f), when the pressure in the lower part 32 has reached a target value (target process value). The film section 43 is now in crease-free contact with the lower surface of the heating plate 42 and can be heated fast. The pressure level is maintained in the lower part 32 during the heating time.

At the end of process block II and at the beginning of process block III, i.e. when the heating time has elapsed, the lower vent valve 37 opens (step g). In addition, the upper pressure valve 38 opens (step h) and closes the upper vent valve 39 (step i). In process block III, the heated film section 43 is now molded. In so doing, the film section 43 is pressed into the lower part 32 and formed into a packaging trough M.

In process block III, the pressure rise produced in the upper part 33 is monitored (step k). While the pressure in the lower part 32 decreases (step j), the pressure in the upper part 33 increases (step k) until a threshold value (target process value) is reached. When the threshold pressure has been reached in the upper part 33, pressure generation in the upper part 33 will be interrupted (step l) and a stabilization time (cooling time) will be started (step m). During the stabilization time, the pressure level in the upper part 33 is maintained, so that the packaging trough M produced will retain its shape. At the end of the stabilization time, the molding process according to process block III is finished. The packaging trough M has now been cured.

At the beginning of process block IV, the upper vent valve 39 opens (step n). This has the effect that the pressure level in the upper part 33 will decrease. From a predetermined pressure threshold (target process value) in the upper part 33 downwards, the lifting mechanism 35 opens the molding station 16 (step o). The molded packaging trough M can now be conveyed out of the molding chamber 34, a new film section 43 to be molded being simultaneously supplied to the molding station 16.

Depending on the type of film and/or the type of tool used, the pressure thresholds referred to in process blocks II and III in the above described example may vary. The control unit 2 is preferably configured to generate the respective pressure thresholds as target process values automatically from the memory 7, in particular by means of the database 10. In addition, the control unit may vary the heating and stabilization times (steps f and m) at least with respect to the film material and/or the types of tools.

Figure 5A:
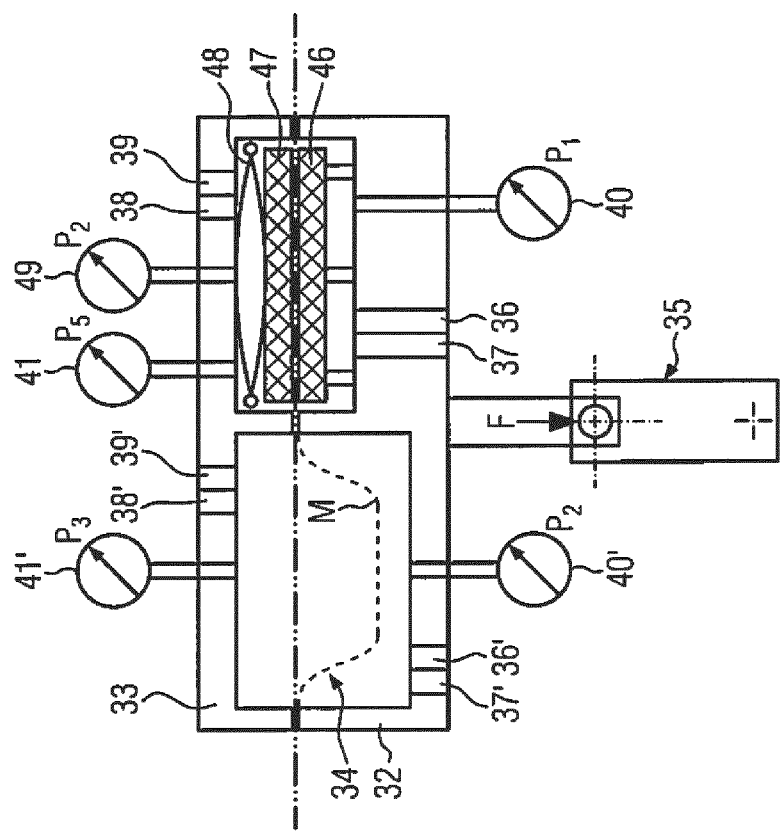
FIG. 5a is a section view of another embodiment of a molding station in accordance with the teachings of the present disclosure.
Figure 5B:
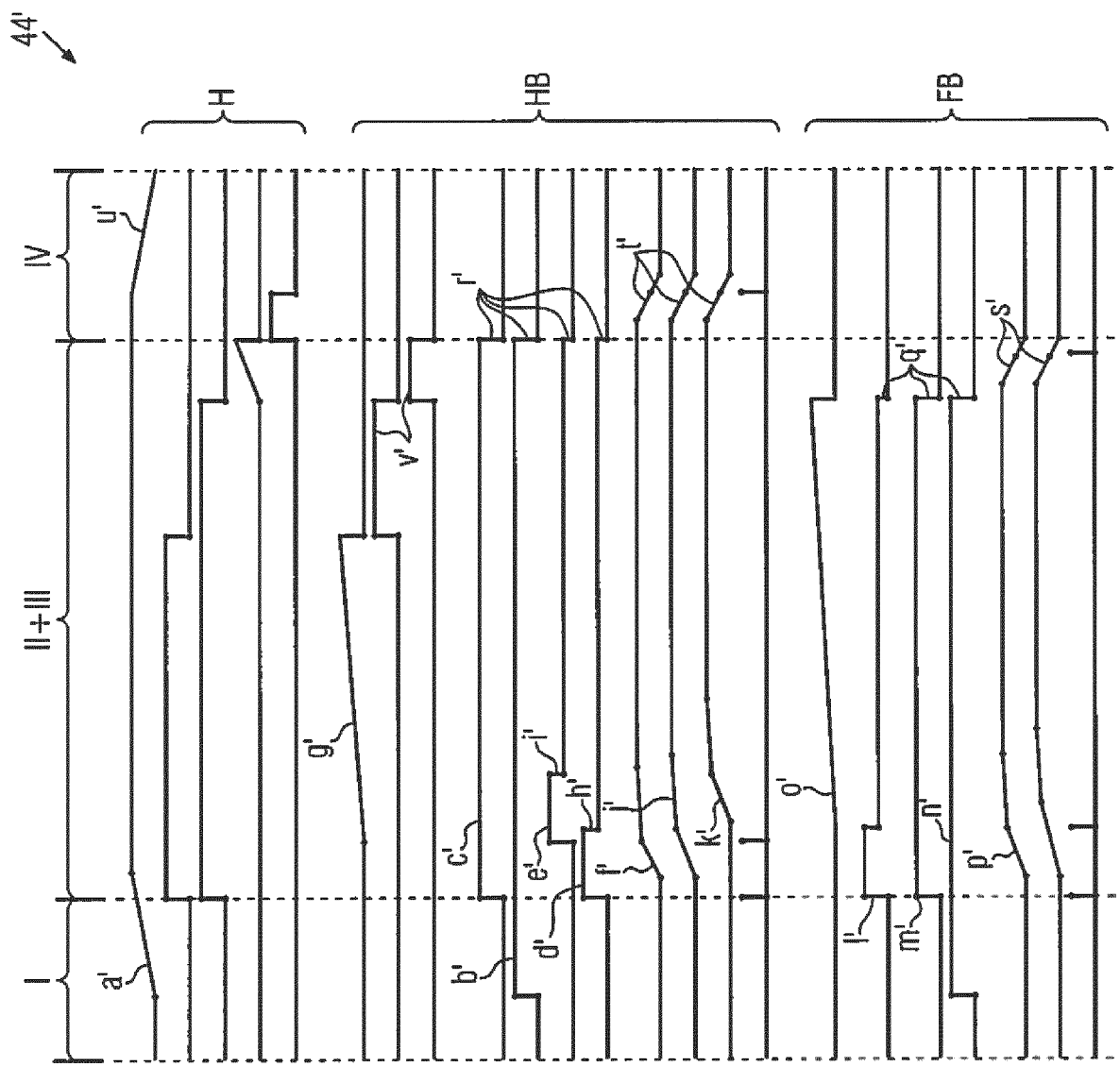

FIG. 5a shows the molding station 16 according to a different embodiment variant. The process mode of the molding station 16 depicted in FIG. 5a is shown in FIG. 5b.

The molding station 16 according to FIG. 5a comprises a separate heating chamber 45, which is operated as a pre-heating unit. When seen in the process direction, the heating chamber 45 is arranged upstream of the molding chamber 34. Inside the heating chamber 45, a lower and an upper heating plate 46, 47 are provided. The film section 43 to be heated extends between these heating plates. Above the upper heating plate 47, a pressure generator 48, in particular an inflatable membrane, is arranged, which, in the inflated condition, presses the upper heating plate 47 against the lower heating plate 46.

In addition, the heating chamber 45 and the molding chamber 34 are each equipped with respective lower and upper pressure and vent valves 36, 36', 37, 37', 38, 38', 39, 39'. The pressures applied are detected in the heating chamber 45 and in the molding chamber 34 by means of respective lower and upper pressure gages 40, 40', 41, 41'. A pressure applied in the pressure generator 48 is determined by means of a pressure generator gage 49.

FIG. 5a shows that the heating chamber 45 as well as the molding chamber 34 can be opened or closed simultaneously, when the lower part 32 is displaced by means of the lifting mechanism 35. It would also be imaginable to configure the lower part 32 as a bipartite component, the respective parts of the lower part 32 being then displaceable separately from each other by means of lifting mechanisms 35 that are specially provided for this purpose.

FIG. 5b shows a process diagram for the molding station 16 depicted in FIG. 5a. In the double-chamber version of the molding station 16, heating and molding take place parallel in time. Hence, the processes from process blocks II and III do not take place one after the other, but, for better intelligibility, heating and molding will be described separately hereinafter.

The process diagram 44' shows in a heating function block HB working processes which take place in the heating chamber 45, and in a molding function block FB working processes which take place in the molding chamber 34.

First, the molding station 16 is closed in process block I (step a'). The lifting mechanism 35 raises the lower part 32, whereby the heating chamber 45 and the molding chamber 34 are closed. The heating function block HB shows that the lower vent valve 37 is closed (step b'). In addition, the heating function block HB shows that the lower pressure valve 36 generates a vacuum in the heating chamber 45 in the lower part 32, so as to pull the film section 43 onto the lower heating plate 46 (step c'). Likewise, a pressure is applied in the upper part 33 of the heating chamber 45, said pressure being, however, optional. To this end, the upper pressure valve 38 opens (step d'). In addition, the pressure generator 48 presses onto the upper heating plate 47, whereby the film section 43 is fixedly clamped in position between the lower and upper heating plates 46, 47 (step e'). In particular, proportional control valves may here be used for precise pressure generation in the upper part 33 of the heating chamber 45.

The heating function block HB also shows that a pressure reaction within the heating chamber 45 starts with a time delay relative to the switching processes at the pressure valves (steps c' and d') (dead time). This is taken into account in the control process of the molding station 16. On the basis of such a dead time control, the valve switching processes (steps c' and d') can already be triggered prematurely, e.g. 100 ms, when the molding station 16 does not yet occupy its closed position (cf. step a'). This is accomplished e.g. by means of a stroke measurement unit for the lifting mechanism 35, said stroke measurement unit transmitting from a certain closing stroke of the lifting mechanism 35 onwards a signal to the control unit, so that the latter will early control the respective valves.

In the heating function block HB, the respective pressures in the heating chamber 45 are initially monitored. As soon as a predetermined pressure level is detected by the pressure gage 40 in the lower part 32 (step f), the control unit 2 initiates a heating process at the lower heating plate 46 (step g'). The pressures in the upper part 33 may be controlled arbitrarily during the heating process. In particular, the pressures in the upper part 33 are lowered from a predetermined pressure onwards within the upper part 33 and/or within the pressure generator 48 to a predetermined pressure level (steps h' and i').

Furthermore, it is shown that the vacuum in the lower part 32 and the pressure in the upper part 33 increase almost simultaneously (steps f and j'). The pressure additionally applied by means of the pressure generator 48 increases with delay (step k'), not until the pressure level in the upper part 33 and/or the vacuum level in the lower part 32 have each assumed a predetermined value.

In the molding function block FB, the lower and/or the upper pressure valve 36', 38' are controlled early, like the lower and/or the upper pressure valve 36, 38 of the heating chamber 45, e.g. 100 ms before the molding station 16 has been closed, according to the dead time control (steps l' and m'). The pressure rise in the upper part 33 and/or the vacuum generation in the lower part 32 are monitored by the pressure gages 40', 41'. The lower vent valve 37' remains closed during the molding process (step n').

From a predetermined pressure in the upper part 33 and/or vacuum in the lower part 32 onwards, the stabilization time starts running (step o'). The stabilization time may especially also be triggered during the pressure and/or vacuum build-up (step p'). During the stabilization time, the molded packaging trough M cools down, whereby it is rendered dimensionally stable.

FIG. 5b shows that the heating time in the heating chamber 45 is shorter than the stabilization time in the molding chamber 34. Nevertheless, the molding chamber 34 is vented earlier than the heating chamber 45 (steps q' and r'). Whereas the molding chamber 34 immediately initiates venting when the stabilization time expires (step q'), the respective valves 36, 37, 38, 39 of the heating chamber 45 are not vented until the pressure and/or the vacuum in the molding chamber 34 have been reduced (step s'). With a certain delay in time, also the pressures in the heating chamber 45 will then be reduced (step t').

As soon as the pressure levels in the molding chamber 34 and in the heating chamber 45 have jointly reached and/or dropped below a predetermined value, the lifting mechanism 35 moves downwards and opens the molding station 16 (step u'). According to FIG. 5b, the molding station 16 could already have been opened at an earlier moment in time (step s'). Hence, it would also be imaginable to use lifting mechanisms 35, which operate separately from one another, at the heating chamber 45 and at the molding chamber 34. Waiting times could be reduced in this way (step v'). Alternatively, the control unit 2 may adapt the times, at which the respective valves at the heating chamber 45 and at the molding chamber 34 are vented, to one another such that a predetermined pressure level for opening the molding station 16 will, at best, occur simultaneously within the heating chamber 45 and within the molding chamber 34. In the case of FIG. 5b, venting of the heating chamber 45 (step r') may e.g. be initiated earlier, so as to reduce the time difference with which the pressure reduction (steps t' and s') takes place.

Figure 6A:
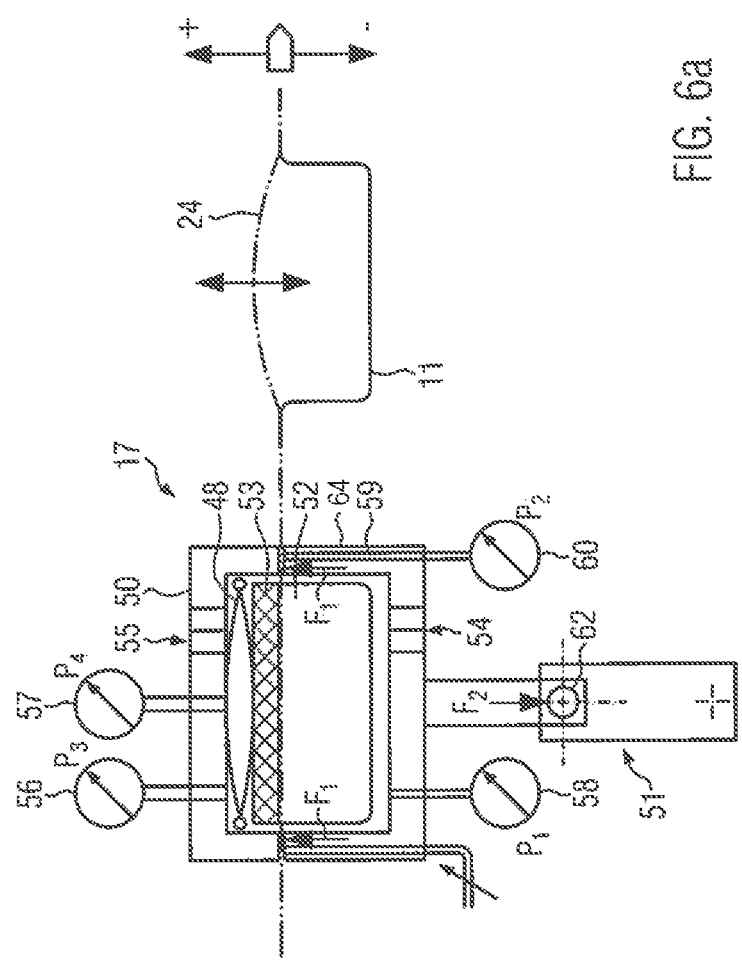
FIG. 6a is a section view of one embodiment of a sealing station in accordance with the teachings of the present disclosure.

FIG. 6a shows the sealing station 17 according to FIG. 2 in an enlarged representation. The process-controlled functional principle according to the present invention can also be applied to this sealing station 17.

According to a further variant, which is not shown in detail, a male die part is provided for the molding chamber 34. According to the prior art, the downward movement of the male die part was started and the molding process was started with a slight delay in a time-controlled manner. According to the variant disclosed by the present invention, the movement of the male die part is started and also the molding process is started as soon as the male die part has reached a predetermined position.

In FIG. 6a, the sealing station 17 comprises a sealing lower part 64 and a sealing upper part 50. The sealing lower part 64 is vertically adjustable by means of a lifting mechanism 51. Between the sealing lower part 64 and the sealing upper part 50, a sealing chamber 52 is defined. In said sealing chamber 52, the cover film 24 is sealed onto the packaging trough M, so as to enclose therein a (food) product. Above the cover film 24, a sealing plate 53 is positioned. Furthermore, a pressure generator 48, e.g. an inflatable membrane, is provided within the sealing upper part 50, said pressure generator 48 being adapted to be used for pressing down the sealing plate 53 so as to seal the cover film 24 onto the packaging trough M.

The sealing lower part 64 comprises a lower valve unit 54 for generating a vacuum and for venting the sealing lower part 64. The sealing upper part 50 comprises an upper valve unit 55 for generating a vacuum and for venting the sealing upper part 50.

The sealing upper part 50 is equipped with an upper pressure gage 56. The pressure in the upper pressure generator 48 is measured by means of a pressure generator gage 57. The sealing lower part 64 is equipped with a lower pressure gage 58. In addition, a vacuum generator 59 is formed in the sealing lower part 64, said vacuum generator 59 being able to generate a vacuum in the packaging trough M. The vacuum generated in the packaging trough M is measured by a vacuum gage 60. For gas-flushing the packaging trough M with an arbitrary atmospheric gas, a gas-flushing unit 61 may be provided in the sealing lower part 64.

Figure 6B:
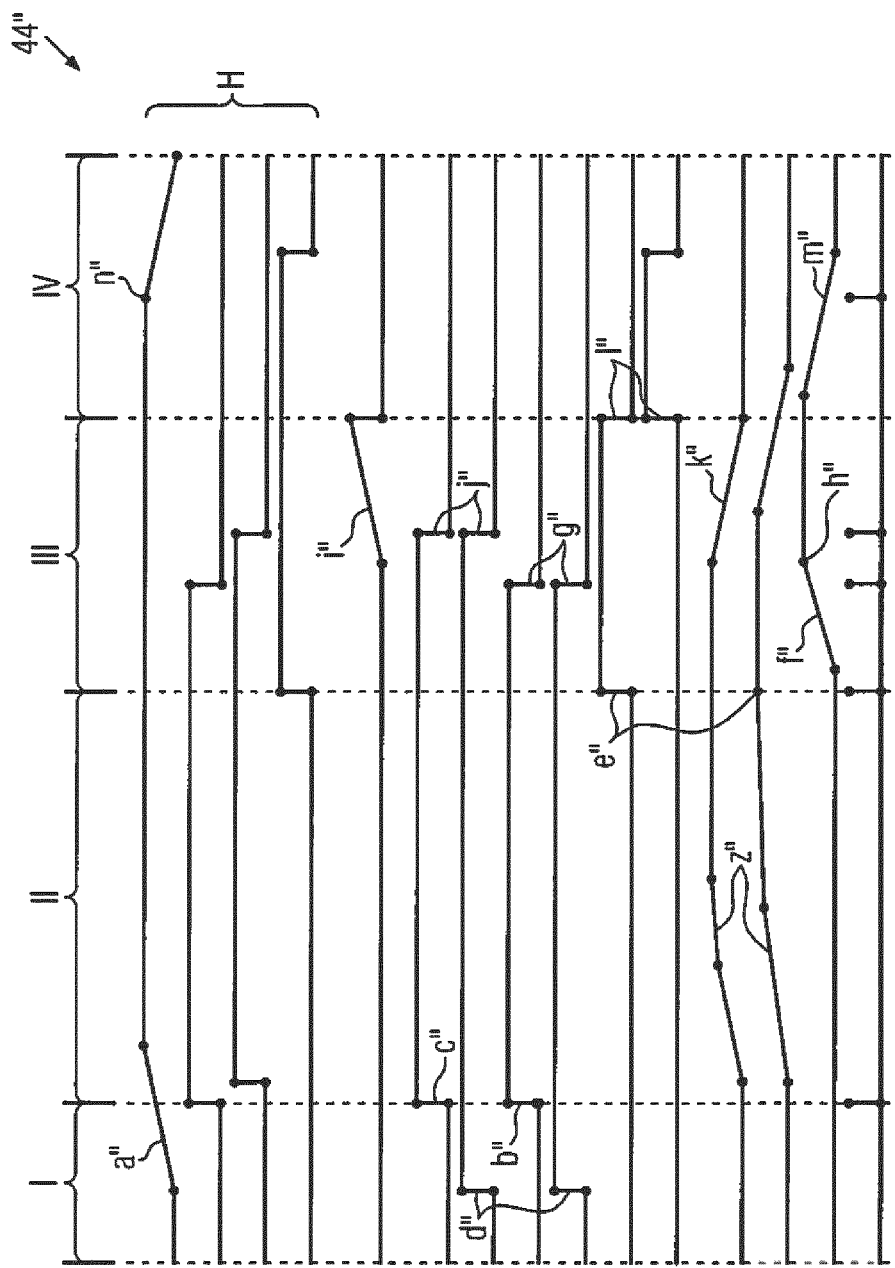
Figure 7B:
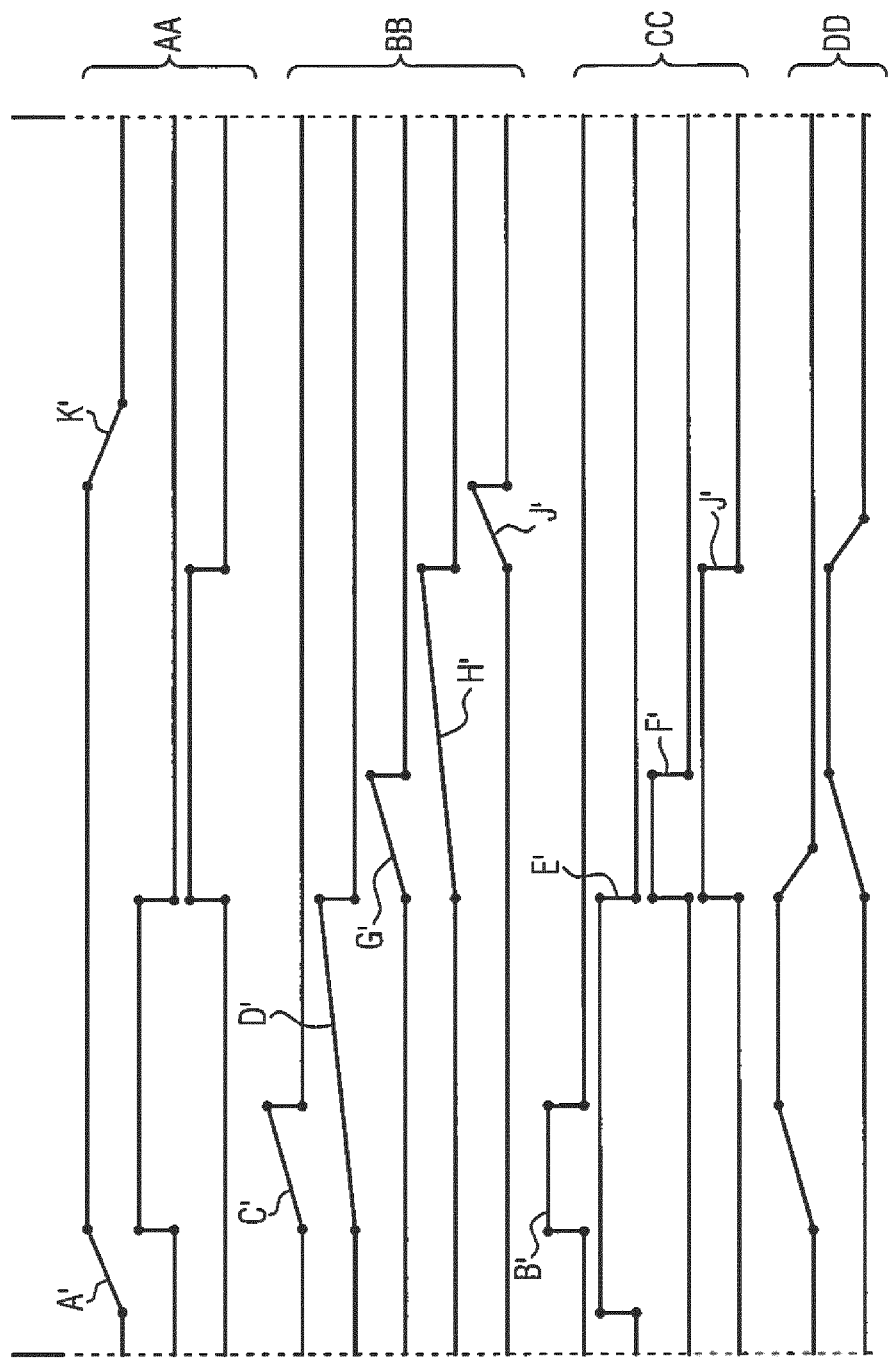

FIG. 6*b* shows the functional connections at the sealing station 17 according to FIG. 6*a*. The sealing process 44" takes place in a process-controlled manner according to the present invention.

In process block I of FIG. 6*b*, the sealing lower part 64 is first moved by means of the lifting mechanism 51 from an open position to a closed position, at which the sealing lower part 64 and the sealing upper part 50 trap the packaging trough M and the cover film 24 positioned on top of the latter within the sealing chamber 52 (step a").

Before the sealing lower part 64 arrives at the closed position, the lower valve unit 54 is actuated for evacuating the sealing lower part 64 (step b"). With a short delay, but still before the sealing lower part 64 arrives at a closed position, the upper valve unit 55 is actuated for evacuating the sealing upper part 50 (step c"). The time in advance, which is used for actuating the valve units 54, 55, serves to eliminate dead times, which add up from the actuation to the valve reaction and still further until the actual pressure or vacuum build-up takes place. These dead times can be determined by the control unit 2 in a test run.

In process block I, the valve units 54, 55 for venting remain closed for building up a vacuum in the sealing lower part 64 as well as in the sealing upper part 50 (step d"). With a certain delay in time, a vacuum is built up in the sealing lower part 64 as well as in the sealing upper part 50 at the beginning of process block I. Through the vacuum generated in the sealing lower part 64, the packaging trough M is first fixed. The vacuum in the sealing upper part 50 ensures that the cover film 24 is oriented on top of the packaging trough M without forming any creases.

In addition, the vacuum pressure profiles within the sealing lower part 64 and the sealing upper part 50 are monitored (step z"). In process block II, a vacuum is generated in the sealing lower part 64 and/or in the sealing upper part 50 until a predetermined vacuum value is detected in the sealing lower part 64 and/or in the sealing upper part 50 (step e").

According to a further variant, a moisture sensor, which is not shown in detail, is provided for detecting the degree of moisture in the vacuum for the product. It may happen that a predetermined final vacuum cannot be accomplished, since the product produces too much moisture. In this case, the control unit will recognize this and finish this process step, although the final vacuum, i.e. the predetermined vacuum value, has not yet been reached.

According to FIG. 6*b*, a predetermined vacuum pressure is reached in the sealing upper part 50 at the end in process block II, which initiates an inflation of the pressure generator 48, whereby the sealing plate 53 is pressed downwards and presses the cover film 24 onto the edge of the packaging trough M. This has the effect that a contact pressure builds up in the sealing area (step f'). This mechanical contact pressure can be measured by means of at least one force sensor 62 (cf. FIG. 6*a*), which is provided in the sealing lower part 64 and/or in the lifting mechanism 51 connected to the latter. Alternatively, also a pressure sensor may be used for determining the pressure of a membrane generating the sealing force.

Shortly thereafter, when the contact pressure is equal to a maximum sealing pressure (step h"), a sealing time is triggered (step i"), in the course of which the cover film 24 is welded to the packaging trough M. The sealing time may be specified depending on the packaging materials used and/or on the type of sealing tool used.

During the sealing time, with a delay in time for venting the sealing lower part 64, also the sealing upper part 50 is vented (step j"). A triggering event for this may especially be the decrease of the vacuum in the sealing lower part 64 to a specific vacuum value (step k").

Until the sealing time has expired in process block III, the sealing plate 53 remains pressed down. As soon as the sealing time has expired, the sealing plate 53 is lifted (step l"). To this end, the pressure is discharged from the pressure generator 48 and monitored (step m"), whereby the sealing plate 53 can be moved back to a starting position. As soon as the pressure in the pressure generator 48 has reached a predetermined value, the sealing station 17 can be opened in process block VI (step n"). The opening of the sealing station 17 may already be initiated, when the sealing plate 53 has not yet fully reached its starting position, i.e. when the pressure in the pressure generator 48 has not yet been eliminated completely. The vacuum in the sealing lower part 64 and in the sealing upper part 50 has already been fully eliminated by venting at this moment in time.

The present invention turns away from a time-based control of the production process of a packaging machine. According to the present invention, time-controlled program sequences are primarily no longer taken into account in the production process, but the packaging machine according to the present invention intervenes by means of the control unit 2 in the production process in a self-controlling manner on the basis of process parameters detected at the time in question, so as to coordinate, in a self-controlling manner, the respective program sequences P executed at the individual working units and/or such that they are adapted with respect to one another. This leads to an economical production process, the packaging machine 1 according to the present invention being, in particular due to a high availability, suitable for producing a large number of different products.

As a further embodiment, it is imaginable that information on and/or specifications of consumables, such as the film web 22 and the cover film 24, are detected automatically, e.g. by means of RFID, and processed by the control. RFID readers 70, 70' may here read an RFID tag applied to the film roll.

Molding or sealing tools may be recognized automatically, preferably in a wire-bound or wireless fashion by means of RFID, identified and/or the information comprised thereon may be read and transmitted into the control.

Figure 8:
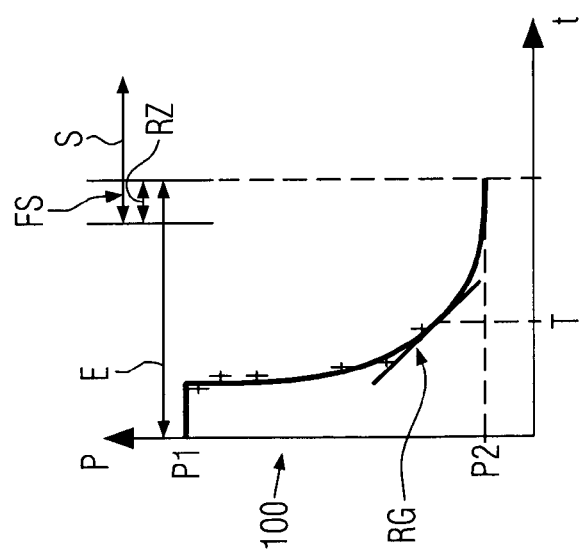
FIG. 8 is a schematic view of an exemplary representation of an early start function for a sealing process of a thermoform packaging machine in accordance with the teachings of the present disclosure.

FIG. 8 shows, on the basis of a pressure-time diagram 100, a pressure profile p plotted against a time t within the sealing station 17 during an evacuating process E, which is the first functional process taking place at the sealing station 17. A sealing process S taking place as a second functional process at the sealing station 17 is started by early start FS, i.e. before the evacuating process E within the sealing chamber 52, in particular within the package to be sealed that belongs to the product to be produced, has decreased from a starting pressure P1 to a target pressure P2.

In FIG. 8, an exponential function which, being a predetermined mathematical function, can be foreseen is approximated on the basis of a plurality of schematically shown measurement points, said exponential function representing the pressure profile to be expected. On the basis of the approximated pressure profile, a target-value end of the evacuating process can be determined and used as a basis for starting the second functional process by early start.

FIG. 8 shows a gradient (rate of change) of the pressure profile at the moment in time T, said gradient being preferably determined by a slope of the regression line RG and being calculable by means of the control unit 2 within a predetermined measurement interval. Based on the slope of the regression line RG, the control unit 2 can determine a remaining time for the evacuating process E on the basis of a rate of change derived from said slope.

Furthermore, FIG. 8 shows that the sealing process S starts by early start FS before the evacuating process E complies with the target value, i.e. before the target pressure P2 has been reached within the sealing station. According to FIG. 8, the early start FS takes place with respect to a reaction time RZ of an actuator used for the sealing process, e.g. with respect to a reaction time of a valve of a pressure membrane used for the sealing process S.

The principle of the early start function according to FIG. 8 can be applied to different functional processes of the packaging machine 1 at one or at a plurality of working units. In particular, it is also imaginable that the control unit is configured to control the working processes of the individual working units with an early start function in dependence on working processes taking place on different working units, e.g. that a feed control is controlled by early start before other working processes have been finished because the respective target values have been reached.

From the foregoing, it will be seen that this invention is one well adapted to attain all the ends and objects hereinabove set forth together with other advantages which are obvious and which are inherent to the structure. It will be understood that certain features and sub combinations are of utility and may be employed without reference to other features and sub combinations. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions and methods described above and illustrated in the drawings are presented by way of example only and are not intended to limit the concepts and principles of the present invention. Thus, there has been shown and described several embodiments of a novel invention.

As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

The invention claimed is:

1. A packaging machine comprising: a control unit, a plurality of measuring devices, and a plurality of working units for different processes, wherein the control unit is functionally connected to the working units and the measuring devices,
   wherein the plurality of measuring devices are configured to detect one or more actual process values at the plurality of working units and forward the one or more actual process values to the control unit, so as to monitor a process status at one or more of the plurality of working units;
   wherein the control unit is configured to establish in a self-controlling manner, by a comparison of the one or more actual process values forwarded to the control unit from the plurality of measuring devices and of associated target process values from one of a memory connected to the control unit, a program sequence for the respective individual working units or an adaptation of the program sequences of one or more of the plurality of working units, wherein each of the one or more of the plurality of working units is operable according to its own program sequence established or adapted depending on the actual process values detected thereat;
   wherein a work cycle at the packaging machine comprises at least a first functional process and a second functional process at one or at different of the plurality of working units, the second functional process being startable later than the first functional process;
   wherein the control unit is configured for executing an early start for the second functional process of a working unit when an actual process value of the preceding first functional process of the program sequence of the working unit or of another working unit has not yet reached the respective target process value;
   wherein the control unit is configured for executing the early start based on a predetermined reaction time of the working unit for the second functional process of the program sequence of the working unit; and
   wherein the control unit is configured for controlling the early start of the second functional process based on an approximation method for predetermining the temporal end of the first functional process using a time-dependent measured variable of the first functional process detected at the working unit using one of the plurality of measuring devices.

2. The packaging machine according to claim 1, wherein the control unit is configured to determine, based on the approximation method, a residual remaining time of the preceding first functional process, said remaining time indicating the length of time until the measured variable will reach the target process value, the control unit being additionally configured for executing the early start, when the remaining time is shorter than or equal to the predetermined reaction time.

3. The packaging machine according to claim 1, wherein using the approximation method, a process-dependent rate of change of a time-dependent measured variable of the first functional process is determinable, the measured variable being detectable at the working unit using one of the measuring devices, or an adaptation to a predetermined mathematical function is executable.

4. The packaging machine according to claim 3, wherein a threshold value for the rate of change is stored for the control unit, wherein the control unit is configured to start a calculation of the remaining time, when the rate of change corresponds to the threshold value or is smaller than the threshold value.

5. The packaging machine according to claim 4, wherein the control unit is configured for determining the threshold value on the basis of a trend control.

6. The packaging machine according to claim 5, wherein the control unit is configured to increase or decrease the threshold value step by step until the calculated remaining time is, at least once, longer than the predetermined reaction time.

7. The packaging machine according to claim 6, wherein the control unit is connected to a circular buffer for specifying the condition.

8. The packaging machine according to claim 2, wherein the control unit is configured to continuously execute a calculation of the remaining time and to delay the early start until the calculated remaining time is shorter than or equal to the predetermined reaction time.

9. The packaging machine according to claim 3, wherein the measured variable is a pressure, which is applied to the working unit and which is detectable using a pressure sensor formed on the working unit and functionally connected to the control unit, and that the rate of change calculable using the control unit-determines a variation rate of the detected pressure.

10. The packaging machine according to claim 1, wherein the control unit is configured to determine a reaction time based on a time measurement, wherein the reaction time is specified as the length of time between an activation of a start signal and an adjusting movement thus caused at the drive unit or has already been specified on the basis of a change of a pressure applied to the working unit or a rate of change of the pressure.

11. The packaging machine according to claim 1, wherein the control unit is configured to cyclically determine a reaction time in the case of each functional process, and to calculate an averaged reaction time by averaging a predetermined number of said determined reaction times, the early start of the second functional process being executable with respect to said averaged reaction time.

12. The packaging machine according to claim 11, wherein the control unit comprises an emergency control for operating the packaging machine, the control unit being configured to replace the process-data-based control of the packaging machine by a time-based control, when a predetermined number of said calculated average reaction times reaches or exceeds a functional threshold value during the operation of the packaging machine.

13. The packaging machine according to claim 1, wherein the packaging machine is a thermoform packaging machine, a tray sealer or a belted chamber machine.

14. The packaging machine according to claim 1, wherein the target process values indicate one of an optimum molding and/or sealing temperature, an optimum heating, sealing or molding pressure, or for a working unit configured as a molding station at least one stabilization time.

15. The packaging machine according to claim 1, wherein the respective measuring devices comprise at least one force, pressure, position, temperature, infrared, ultrasonic, induction, laser and/or moisture sensor.

16. A method of self-controlling a program sequence of a process at at a plurality of working units of a packaging machine comprising the steps of:
    executing at one or more working units the program sequence of one process or the program sequence of a plurality of processes that are functionally adapted to one another while the packaging machine is in operation;
    detecting actual process values at the one or more of the plurality of working units;
    forwarding the detected actual process values to a control unit of the packaging machine;
    comparing the actual process values forwarded to the control unit with associated target process values; and
    establishing, in a self-controlling manner, the respective program sequence for the individual working units and/or adapting the respective program sequences of the respective working units with respect to one another; and
    coordinating the operation of the packaging machine based upon the established and/or adapted program sequences, wherein within a work cycle at the packaging machine at least a first functional process and a second functional process take place at one or at different working units, the second functional process starting later than the first functional process;
    executing an early start for the second functional process of the program sequence of a working unit using the control unit, if an actual process value of the first functional process of the program sequence of the working unit or of another working unit has not yet reached the respective target process value;
    executing the early start using the control unit based on a predetermined reaction time of the working unit for the second functional process of the program sequence of the working unit; and
    controlling the early start of the second functional process using the control unit based on an approximation method for predetermining the temporal end of the first functional process using a time-dependent measured variable of the first functional process detected at the work station using one of the measuring devices.

17. The method according to claim 16, further comprising the steps of: determining, based on the approximation method, a residual remaining time of the first functional process using the control unit, said residual remaining time indicating the length of time until the measured variable will reach the target process value, the control unit additionally initiating the early start at the latest, when the remaining time is shorter than or equal to the predetermined reaction time.

18. The method according to claim 16, wherein the approximation method determines a rate of change of the measured variable of the first functional process detected at the work station or executes an adaptation to a predetermined mathematical function.

19. The method according to claim 18, further comprising the step of determining a threshold value for the rate of change using the control unit, wherein the control unit starts a calculation of the remaining time, when the rate of change corresponds to the threshold value or is smaller than the threshold value.

20. The method according to claim 19, further comprising the step of calculating the threshold value on the basis of a trend control using the control unit.

21. The method according to claim 18 further comprising the steps of detecting a pressure applied to the working unit using a pressure sensor formed on the working unit and functionally connected to the control unit; and
    specifying a variation rate of the detected pressure as a rate of change using the control unit and determining the remaining time on this basis.

22. The method according to claim 21, further comprising the steps of triggering a sealing process at a sealing station configured as a working unit by the early start, and that the detecting the pressure step is carried out during an evacuating process or a gas-flushing process preceding the sealing process.

23. The method according to claim 16, further comprising the steps of determining the reaction time based on a time measurement using the control unit, wherein the reaction time is one of (a) specified as the length of time between an activation of a start signal and an adjusting movement thus caused at the drive unit or (b) has already been specified on the basis of a change of a pressure applied to the working unit or a rate of change of the pressure.

24. The method according to claim 16, further comprising the steps of cyclically determining the reaction time in the case of each cyclically repeated second functional process using the control unit, and determining an averaged reaction time by averaging a predetermined number of detected reaction times, the early start of the second functional process being executed with respect to said averaged reaction time.

25. The method according to claim 16, further comprising the steps of executing an emergency control for operating the packaging machine using the control unit, and the control unit replacing the process-data-based control of the packaging machine by a time-based control, when a predetermined number of calculated reaction times reaches or exceeds a functional threshold value during the operation of the packaging machine.

\* \* \* \* \*

UNITED STATES PATENT AND TRADEMARK OFFICE
CERTIFICATE OF CORRECTION

PATENT NO. : 11,021,288 B2
APPLICATION NO. : 15/750488
DATED : June 1, 2021
INVENTOR(S) : Tobias Enderle et al.

It is certified that error appears in the above-identified patent and that said Letters Patent is hereby corrected as shown below:

In the Claims

Column 25, Lines 63-64, Claim 16:
After "a program sequence of a process at"
Delete "at" (second occurrence)

Signed and Sealed this
Twenty-third Day of November, 2021

Drew Hirshfeld
*Performing the Functions and Duties of the
Under Secretary of Commerce for Intellectual Property and
Director of the United States Patent and Trademark Office*